United States Patent
Szabo et al.

(10) Patent No.: US 9,154,423 B1
(45) Date of Patent: Oct. 6, 2015

(54) MINIMIZE SYN-FLOOD ISSUES WITH FLOW CACHE WHILE MAINTAINING PERFORMANCE

(71) Applicant: F5 Networks, Inc., Seattle, WA (US)

(72) Inventors: Paul Imre Szabo, Shoreline, WA (US); Peter Michael Thornewell, Seattle, WA (US); Timothy Scott Michels, Greenacres, WA (US); Hao Cai, Sammamish, WA (US)

(73) Assignee: F5 Networks, Inc., Seattle, WA (US)

( * ) Notice: Subject to any disclaimer, the term of this patent is extended or adjusted under 35 U.S.C. 154(b) by 47 days.

(21) Appl. No.: 13/802,169

(22) Filed: Mar. 13, 2013

Related U.S. Application Data

(60) Provisional application No. 61/641,232, filed on May 1, 2012.

(51) Int. Cl.
*H04L 12/801* (2013.01)
*H04L 12/803* (2013.01)
(Continued)

(52) U.S. Cl.
CPC .......... *H04L 47/122* (2013.01); *H04W 28/02* (2013.01); *H04W 28/10* (2013.01); *H04L 47/10* (2013.01)

(58) Field of Classification Search
CPC ..... H04L 47/122; H04L 47/10; H04W 28/02; H04W 28/10
USPC .......... 370/229, 235, 237, 241, 248, 351, 428
See application file for complete search history.

(56) References Cited

U.S. PATENT DOCUMENTS

| | | | |
|---|---|---|---|
| 3,950,735 | A | 4/1976 | Patel |
| 4,644,532 | A | 2/1987 | George et al. |

(Continued)

FOREIGN PATENT DOCUMENTS

| | | |
|---|---|---|
| EP | 0 744 850 A2 | 11/1996 |
| WO | 91/14326 A2 | 9/1991 |

(Continued)

OTHER PUBLICATIONS

International Search Report and Written Opinion for International Patent Application No. PCT/US2013/038168 mailed Aug. 14, 2013.

(Continued)

*Primary Examiner* — Obaidul Huq
(74) *Attorney, Agent, or Firm* — John W. Branch; Lowe Graham Jones PLLC

(57) ABSTRACT

Embodiments are directed towards minimizing the impact flood attacks may have on packet traffic management performance. A packet traffic management device ("PTMD") may employ a data flow segment ("DFS") and control segment ("CS"). The CS may perform high-level control functions and per-flow policy enforcement for connection flows maintained at the DFS, while the DFS may perform statistics gathering, per-packet policy enforcement (e.g., packet address translations), or the like, on connection flows maintained at the DFS. The DFS may include high-speed flow caches and other high-speed components that may be comprised of high-performance computer memory. The impact of flood attacks may be reduced by protecting the high-speed flow caches from being consumed by flow control data associated with malicious and/or in-operative non-genuine network connections. In at least one of the various embodiments, flood control filters may be adaptively activated based on the condition and quality of network traffic received at PTMD.

24 Claims, 12 Drawing Sheets

(51) Int. Cl.
*H04W 28/02* (2009.01)
*H04W 28/10* (2009.01)

(56) References Cited

U.S. PATENT DOCUMENTS

| | | | |
|---|---|---|---|
| 4,965,772 A | 10/1990 | Daniel et al. | |
| 5,023,826 A | 6/1991 | Patel | |
| 5,053,953 A | 10/1991 | Patel | |
| 5,299,312 A | 3/1994 | Rocco, Jr. | |
| 5,327,529 A | 7/1994 | Fults et al. | |
| 5,367,635 A | 11/1994 | Bauer et al. | |
| 5,371,852 A | 12/1994 | Attanasio et al. | |
| 5,406,502 A | 4/1995 | Haramaty et al. | |
| 5,475,857 A | 12/1995 | Dally | |
| 5,517,617 A | 5/1996 | Sathaye et al. | |
| 5,519,694 A | 5/1996 | Brewer et al. | |
| 5,519,778 A | 5/1996 | Leighton et al. | |
| 5,521,591 A | 5/1996 | Arora et al. | |
| 5,528,701 A | 6/1996 | Aref | |
| 5,581,764 A | 12/1996 | Fitzgerald et al. | |
| 5,596,742 A | 1/1997 | Agarwal et al. | |
| 5,606,665 A | 2/1997 | Yang et al. | |
| 5,611,049 A | 3/1997 | Pitts | |
| 5,663,018 A | 9/1997 | Cummings et al. | |
| 5,752,023 A | 5/1998 | Choucri et al. | |
| 5,761,484 A | 6/1998 | Agarwal et al. | |
| 5,768,423 A | 6/1998 | Aref et al. | |
| 5,774,660 A | 6/1998 | Brendel et al. | |
| 5,790,554 A | 8/1998 | Pitcher et al. | |
| 5,802,052 A | 9/1998 | Venkataraman | |
| 5,875,296 A | 2/1999 | Shi et al. | |
| 5,892,914 A | 4/1999 | Pitts | |
| 5,892,932 A | 4/1999 | Kim | |
| 5,919,247 A | 7/1999 | Van Hoff et al. | |
| 5,936,939 A | 8/1999 | Des Jardins et al. | |
| 5,946,690 A | 8/1999 | Pitts | |
| 5,949,885 A | 9/1999 | Leighton | |
| 5,951,694 A | 9/1999 | Choquier et al. | |
| 5,959,990 A | 9/1999 | Frantz et al. | |
| 5,974,460 A | 10/1999 | Maddalozzo, Jr. et al. | |
| 5,983,281 A | 11/1999 | Ogle et al. | |
| 6,006,260 A | 12/1999 | Barrick, Jr. et al. | |
| 6,006,264 A | 12/1999 | Colby et al. | |
| 6,026,452 A | 2/2000 | Pitts | |
| 6,028,857 A | 2/2000 | Poor | |
| 6,051,169 A | 4/2000 | Brown et al. | |
| 6,078,956 A | 6/2000 | Bryant et al. | |
| 6,085,234 A | 7/2000 | Pitts et al. | |
| 6,092,196 A | 7/2000 | Reiche | |
| 6,108,703 A | 8/2000 | Leighton et al. | |
| 6,111,876 A | 8/2000 | Frantz et al. | |
| 6,178,423 B1 | 1/2001 | Douceur et al. | |
| 6,182,139 B1 | 1/2001 | Brendel | |
| 6,192,051 B1 | 2/2001 | Lipman et al. | |
| 6,246,684 B1 | 6/2001 | Chapman et al. | |
| 6,253,230 B1 | 6/2001 | Couland et al. | |
| 6,263,368 B1 | 7/2001 | Martin | |
| 6,327,622 B1 | 12/2001 | Jindal et al. | |
| 6,374,300 B2 | 4/2002 | Masters | |
| 6,396,833 B1 | 5/2002 | Zhang et al. | |
| 6,601,084 B1 | 7/2003 | Bhaskaran et al. | |
| 6,636,894 B1 | 10/2003 | Short et al. | |
| 6,650,641 B1 | 11/2003 | Albert et al. | |
| 6,742,045 B1 | 5/2004 | Albert et al. | |
| 6,751,663 B1 | 6/2004 | Farrell et al. | |
| 6,754,228 B1 | 6/2004 | Ludwig | |
| 6,760,775 B1 | 7/2004 | Anerousis et al. | |
| 6,772,219 B1 | 8/2004 | Shobatake | |
| 6,779,039 B1 | 8/2004 | Bommareddy et al. | |
| 6,781,986 B1 | 8/2004 | Sabaa et al. | |
| 6,798,777 B1 | 9/2004 | Ferguson et al. | |
| 6,868,082 B1 | 3/2005 | Allen, Jr. et al. | |
| 6,876,629 B2 | 4/2005 | Beshai et al. | |
| 6,876,654 B1 | 4/2005 | Hegde | |
| 6,888,836 B1 | 5/2005 | Cherkasova | |
| 7,343,413 B2 | 3/2008 | Gilde et al. | |
| 7,561,517 B2 | 7/2009 | Klinker et al. | |
| 8,024,483 B1 | 9/2011 | Rothstein et al. | |
| 2001/0037387 A1* | 11/2001 | Gilde et al. | 709/225 |
| 2002/0138618 A1 | 9/2002 | Szabo | |
| 2004/0039820 A1 | 2/2004 | Colby et al. | |
| 2004/0111635 A1 | 6/2004 | Boivie et al. | |
| 2008/0162390 A1 | 7/2008 | Kapoor et al. | |
| 2008/0181226 A1* | 7/2008 | Varier et al. | 370/390 |
| 2008/0256239 A1 | 10/2008 | Gilde et al. | |
| 2009/0003204 A1* | 1/2009 | Okholm et al. | 370/230 |
| 2009/0106426 A1 | 4/2009 | Chen et al. | |
| 2009/0209262 A1 | 8/2009 | Stamoulis et al. | |
| 2009/0327514 A1 | 12/2009 | Foschiano et al. | |
| 2010/0121972 A1 | 5/2010 | Samuels et al. | |
| 2010/0315992 A1 | 12/2010 | Turanyi | |
| 2011/0075675 A1 | 3/2011 | Koodli et al. | |
| 2011/0179183 A1 | 7/2011 | Lindsay | |
| 2012/0320788 A1* | 12/2012 | Venkataramanan et al. | 370/253 |
| 2013/0044741 A1 | 2/2013 | Lappaetelainen et al. | |
| 2013/0083661 A1 | 4/2013 | Gupta et al. | |

FOREIGN PATENT DOCUMENTS

| | | |
|---|---|---|
| WO | 95/05712 A2 | 2/1995 |
| WO | 97/09805 A1 | 3/1997 |
| WO | 97/45800 A1 | 12/1997 |
| WO | 99/05829 A1 | 2/1999 |
| WO | 99/06913 A1 | 2/1999 |
| WO | 99/10858 A2 | 3/1999 |
| WO | 99/39373 A2 | 8/1999 |
| WO | 99/64967 A1 | 12/1999 |
| WO | 00/04422 A2 | 1/2000 |
| WO | 00/04458 A1 | 1/2000 |

OTHER PUBLICATIONS

FIPS 197, Advanced Encryption Standard (AES), Nov. 26, 2001, NIST, all pages.

Official Communication for U.S. Appl. No. 13/461,675 mailed Jan. 27, 2014.

"A Process for Selective Routing of Servlet Content to Transcoding Modules," Research Disclosure 422124, IBM Corporation, pp. 889-890, Jun. 1999.

"Servlet/Applet/HTML Authentication Process With Single Sign-On," Research Disclosure 429128, IBM Corporation, pp. 163-164, Jan. 2000.

Office Communication for U.S. Appl. No. 13/461,675 mailed on Aug. 14, 2014.

Office Communication for U.S. Appl. No. 13/772,194 mailed on Jul. 25, 2014.

Office Communication U.S. Appl. No. 13/772,192 mailed on Jan. 26, 2015 (21 pages).

Office Communication for U.S. Appl. No. 13/772,194 mailed on Apr. 15, 2015 (9 pages).

Office Communication for U.S. Appl. No. 13/802,254 mailed on May 18, 2015 (16 pages).

* cited by examiner

MINIMIZE SYN-FLOOD ISSUES WITH FLOW CACHE WHILE MAINTAINING PERFORMANCE

RELATED APPLICATIONS

This application is a Utility Patent application based on a previously filed U.S. Provisional Patent application, U.S. Ser. No. 61/641,232 filed on May 1, 2012, the benefit of the filing date of which is hereby claimed under 35 U.S.C. §119(e).

TECHNICAL FIELD

The present invention relates generally to packet traffic management and, more particularly, but not exclusively to determining if network flow control data should be off-loaded to data flow segment stored in a high-speed cache.

BACKGROUND

The expanded use of the Internet has increased communication connections between client devices and server devices. Often, a client device establishes a network connection with a server device by using well-known protocols, such as Transmission Control Protocol/Internet Protocol ("TCP/IP"), User Datagram Protocol ("UDP"), and the like. This network connection may be identified by one characteristic or a combination of characteristics, such as a source port, a destination port, a source address, a destination address, a protocol, and the like. Typically, the source address, destination address, destination port, and protocol are relatively fixed for a network connection between a client device and a server device. Thus, the source port may be utilized to uniquely identify a connection between the client device and the server device. Currently, however, the number of source port values that may be utilized may be rather limited (e.g., $2^{16}$ minus 1024 (i.e., system ports assigned by the Internet Assigned Numbers Authority, as per Request for Comments ("RFC") 6335). Therefore, in situations where thousands of connections are established between a client device and a server device, the source port values may no longer uniquely identify a connection and may be cycled through and reused for different connections. Typically, a source port value may be recycled and used again under certain conditions, such as after a predetermined time limit. However, if the recycle time limit (e.g., 2 ms) is less than the amount of time a connection is established (e.g., 2 sec.), then a source port value may be recycled before a previous connection using the same source port value is closed. Furthermore, SYN flood requests might also have an identical source address, destination address, source port, destination port, and protocol type as an established TCP connection.

Additionally, the expansion of the Internet has led to improvements in packet traffic management. One such advancement is to split operations between a control segment and a data flow segment as described in more detail in U.S. Pat. No. 7,343,413, filed Mar. 21, 2001, and entitled "Method and System for Optimizing a Network by Independently Scaling Control Segments and Data Flow," which is hereby incorporated by reference in its entirety into this patent application. SYN flood requests and other malicious network activity may interfere with efficiently splitting network flow control operations between the control segment and the data flow segment. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Detailed Description, which is to be read in association with the accompanying drawings, wherein.

DETAILED DESCRIPTION

Figure 1:
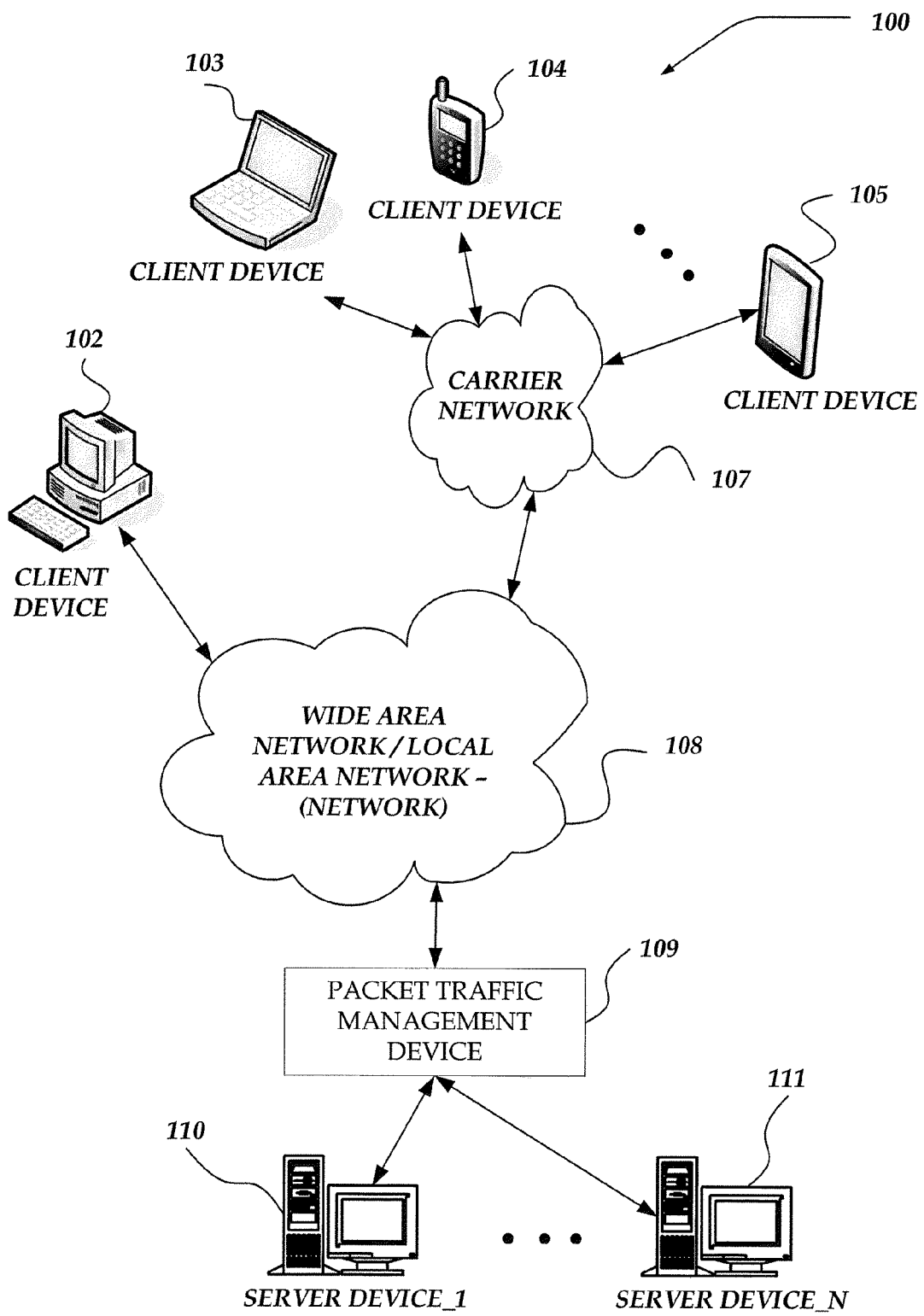
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "SYN" refers to a packet transmitted utilizing TCP that includes a set synchronize control flag in a TCP header of the packet.

As used herein, the term "ACK" refers to a packet transmitted utilizing TCP that includes a set acknowledgment flag in a TCP header of the packet.

As used herein, the term "SYN_ACK" refers to a packet transmitted utilizing TCP that includes a set synchronize control flag and a set acknowledgment flag in a TCP header of the packet.

As used herein, the term "FIN" refers to a packet transmitted utilizing TCP that includes a set no more data from sender flag in a TCP header of the packet.

As used herein, the term "FIN_ACK" refers to a packet transmitted utilizing TCP that includes a set no more data from sender flag and a set acknowledgment flag in a TCP header of the packet. FIN_ACK compress a FIN and ACK into one TCP packet.

As used herein, the term "tuple" refers to a set of values that identify a source and destination of a connection. In one embodiment, a 5 tuple may include a source address, a destination address, a source port, a destination port, and a protocol identifier. In at least one of the various embodiments, tuples may be used to identify network flows.

As used herein, the terms "network flow," "connection flow,", "flow" refer to a network session that may be established between two endpoints. In at least one of the various embodiments, a tuple may describe the flow. In at least one of the various embodiments, flow control data associated with connection flows may be used to ensure that the network packets sent between the endpoints of a connection flow may be routed along the same path. In at least one of the various embodiments, the performance of connection oriented network protocols such as TCP/IP may impaired if network packets may be routed using varying paths and/or directed different endpoints.

As used herein, the term "genuine connection flow," refers to a connection flow that may have been determined to be associated with an operative client-server communication session. In contrast, a non-genuine connection flow may be associated with a malicious attack such as a SYN flood attack. In at least one of the various embodiments, characteristics a genuine connection flows may include, TCP/IP handshaking complete, evidence of bi-directional network packet exchange, or the like. Likewise, evidence that a connection flow may be non-genuine may include, half-open connections (incomplete handshaking and connection setup), few if any network packets exchanged, or the like.

As used herein, the term "high speed flow cache" refers to memory based cache used for storing flow control data that corresponds to connection flows. The cache may be accessible using, dedicated busses that may provide very fast performance based on a combination of factors that may include, wide-busses, fast clock speeds, dedicated channels, specialized read and/or write buffer, hardware proximity, temperature control, or the like. Also, the high speed flow cache may be comprised of very fast random access memory (RAM) components such as, static random access memory (SRAM), asynchronous SRAM, burst SRAM, extended data output dynamic RAM (EDO DRAM), or the like. In most cases, the high performance characteristics of the high speed flow cache often are very expensive and comprise valuable "real estate" within a traffic management device.

As used herein, the term "flood attack" refers to malicious attacks on a network device. In at least one of the various embodiments, such attacks often entail a high volume connection opening and/or establishing commands being sent to a network device where the handshake to complete the connection may not be completed. Also, flood attacks may comprise attacks that complete the connection handshake but the client endpoint doesn't send any data and/or the endpoint has been spoofed and does not actually represent a genuine connection endpoint. In some case, because the attacking client does not respond to the network device usually the network device must wait for an inactivity timeout condition to be reached before removing the non-genuine connection.

In at least one of the various embodiments, the general goal of flood attacks is to fill up (e.g., flood) the network device with inoperative non-genuine network connections such the ability of the network device to operate and/or process genuine network connections may be impaired (Denial of Service). SYN flood attacks (e.g., SYN flooding) are a flood attacks that may be targeted at network devices that support TCP/IP.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards minimizing the impact flood attacks may have on packet traffic management performance. In at least one of the various embodiments, a packet traffic management device ("PTMD") may employ a data flow segment ("DFS") component and control segment ("CS") component. In at least one of the various embodiments, the CS may perform high-level control functions and per-flow policy enforcement for connection flows maintained at the DFS, while the DFS may perform statistics gathering, per-packet policy enforcement (e.g., packet address translations), or the like, on connection flows maintained at the DFS.

The CS may be utilized to generate flow control data for connection flows that may be offloaded to the DFS based on connection flow requests received at the packet traffic management device. In one embodiment, the CS may receive a new connection flow request, such as a SYN packet, sent by a client device. The CS may generate and cache a connection flow identifier for the connection flow request. In at least one of the various embodiments, the DFS may include high-speed flow caches and other high-speed components. In at least one of the various embodiments, the high-speed flow cache may be enable to store a defined amount of flow control data that may limit the number of connection flows that may be offloaded to the DFS. In at least one of the various embodiments, making efficient use of the high speed flow cache capacity may be improved by minimizing the number of malicious and/or in-operative connections flows (e.g., non-genuine flow) that may be have flow control data stored in the high-speed flow cache.

In at least one of the various embodiments, the impact of flood attacks may be reduced by protecting the high-speed flow caches that may be on the DFS from being consumed by flow control data associated with malicious and/or in-operative network connections and/or non-genuine connection flows. In at least one of the various embodiments, flood control filters and/or protection processes may be adaptively activated based on the condition and quality of network traffic received at PTMD.

In at least one of the various embodiments, if a new network connection flow may be received it may be forwarded to a control segment (CS). In at least one of the various embodiments, the CS may generate the flow control data for the new network connection flow. In one embodiment, if the CS determines that the new network connection flow should be offloaded to the DFS, the CS may send a control message that may include the flow control data to the DFS. In at least one of the various embodiments, the DFS may store the received flow control data into the high-speed flow cache that may correspond to the DFS.

In at least one of the various embodiments, the CS may examine connection flows as they are evicted from the DFS to determine if the evicted connection flows may be genuine. In at least one of the various embodiments, if the number of identified non-genuine flows exceeds a defined threshold the CS may enable filters and protections to guard against possible flood attacks (e.g., SYN flooding).

In at least one of the various embodiments, if flood control filters/protections may be enabled and if the CS determines that the new connection flow may be a non-genuine flow that may be associated with a flood attack, offloading the new connection flow toe the DFS may be delayed until the CS determines that the new connection flow is a genuine connection flow.

In at least one of the various embodiments, offloading a connection flow to the DFS enables the DFS to manage packet translation using flow control data that may have generated by the CS. In at least one of the various embodiments, connection flows offloaded to the DFS may benefits from performance improvements that arising from the high-performance hardware that may comprise the DFS. In at least one of the various embodiments, storing the flow control data for connection flows in the high-speed flow cache that may correspond to the DFS may occur if the connection flow may be offloaded to the DFS.

Illustrative Operating Environment

FIG. 1 shows components of one embodiment of an environment in which the invention may be practiced. Not all of the components may be required to practice the invention, and variations in the arrangement and type of the components may be made without departing from the spirit or scope of the invention.

As shown, system 100 of FIG. 1 includes local area networks ("LANs")/wide area networks ("WANs")-(network) 108, wireless network 107, client devices 102-105, packet traffic management device ("PTMD") 109, and server devices 110-111. Network 108 is in communication with and enables communication between client devices 102-105, wireless network 107, and PTMD 109. Carrier network 107 further enables communication with wireless devices, such as client devices 103-105. PTMD 109 is in communication with network 108 and server devices 110-111.

One embodiment of client devices 102-105 is described in more detail below in conjunction with FIG. 2. In one embodiment, at least some of client devices 102-105 may operate over a wired and/or a wireless network, such as networks 107 and/or 108. Generally, client devices 102-105 may include virtually any computing device capable of communicating over a network to send and receive information, including instant messages, performing various online activities, or the like. It should be recognized that more or less client devices may be included within a system such as described herein, and embodiments are therefore not constrained by the number or type of client devices employed.

Devices that may operate as client device 102 may include devices that typically connect using a wired or wireless communications medium, such as personal computers, servers, multiprocessor systems, microprocessor-based or programmable consumer electronics, network PCs, or the like. In some embodiments, client devices 102-105 may include virtually any portable computing device capable of connecting to another computing device and receiving information, such as laptop computer 103, smart phone 104, tablet computer 105, or the like. However, portable computer devices are not so limited and may also include other portable devices, such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may provide access to various computing applications, including a browser, or other web-based applications.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send data between another computing device. The client application may include a capability to send and/or receive content, or the like. The client application may further provide information that identifies itself, including a type, capability, name, or the like. In one embodiment, client devices 102-105 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, PTMD 109, server devices 110-111, or other computing devices.

Client devices 102-105 may further be configured to include a client application that enables an end-user to log into an end-user account that may be managed by another computing device, such as server devices 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Carrier network 107 is configured to couple client devices 103-105 and its components with network 108. Carrier network 107 may include any of a variety of wireless sub-networks that may further overlay stand-alone ad-hoc networks, and the like, to provide an infrastructure-oriented connection for client devices 102-105. Such sub-networks may include mesh networks, Wireless LAN ("WLAN") networks, cellular networks, and the like. In one embodiment, the system may include more than one wireless network.

Carrier network 107 may further include an autonomous system of terminals, gateways, routers, and the like connected by wireless radio links, and the like. These connectors may be configured to move freely and randomly and organize themselves arbitrarily, such that the topology of carrier network 107 may change rapidly.

Carrier network 107 may further employ a plurality of access technologies including 2nd (2G), 3rd (3G), 4th (4G) 5$^{th}$ (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, carrier network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, carrier network 107 may include virtually any wireless communication mechanism by which information may travel between client devices 103-105 and another computing device, network, and the like.

Network 108 is configured to couple network devices with other computing devices, including, server devices 110-111 through PTMD 109, client device 102, and client devices 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of PTMD 109 is described in more detail below in conjunction with FIG. 3. Briefly, however, PTMD 109 may include virtually any network device capable of managing network traffic between client devices 102-105 and server devices 110-111. Such devices include, for example, routers, proxies, firewalls, load balancers, cache devices, devices that perform network address translation, or the like, or any combination thereof. PTMD 109 may perform the operations of routing, translating, switching packets, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server device to direct a request. Such load balancing operations may be based on network traffic, network topology, capacity of a server, content requested, or a host of other traffic distribution mechanisms.

PTMD 109 may include a control segment and a separate data flow segment. The control segment may include software-optimized operations that perform high-level control functions and per-flow policy enforcement for packet traffic management. In at least one of the various embodiments, the control segment may be configured to manage connection flows maintained at the data flow segment. In one embodiments, the control segment may provide instructions, such as, for example, a packet translation instruction, to the data flow segment to enable the data flow segment to route received packets to a server device, such as server device 110-111. The data flow segment may include hardware-optimized operations that perform statistics gathering, per-packet policy enforcement (e.g., packet address translations), high-speed flow caches, or the like, on connection flows maintained at DFS between client devices, such as client devices 102-105, and server devices, such as server devices 110-111.

Server devices 110-111 may include virtually any network device that may operate as a website server. However, server devices 110-111 are not limited to website servers, and may also operate as messaging server, a File Transfer Protocol (FTP) server, a database server, content server, or the like. Additionally, each of server devices 110-111 may be configured to perform a different operation. Devices that may operate as server devices 110-111 include various network devices, including, but not limited to personal computers, desktop computers, multiprocessor systems, microprocessor-based or programmable consumer electronics, network PCs, server devices, network appliances, and the like.

Although FIG. 1 illustrates server devices 110-111 as single computing devices, the invention is not so limited. For example, one or more functions of each of server devices 110-111 may be distributed across one or more distinct network devices. Moreover, server devices 110-111 are not limited to a particular configuration. Thus, in one embodiment, server devices 110-111 may contain a plurality of network devices that operate using a master/slave approach, where one of the plurality of network devices of server devices 110-111 operate to manage and/or otherwise coordinate operations of the other network devices. In other embodiments, the server devices 110-111 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
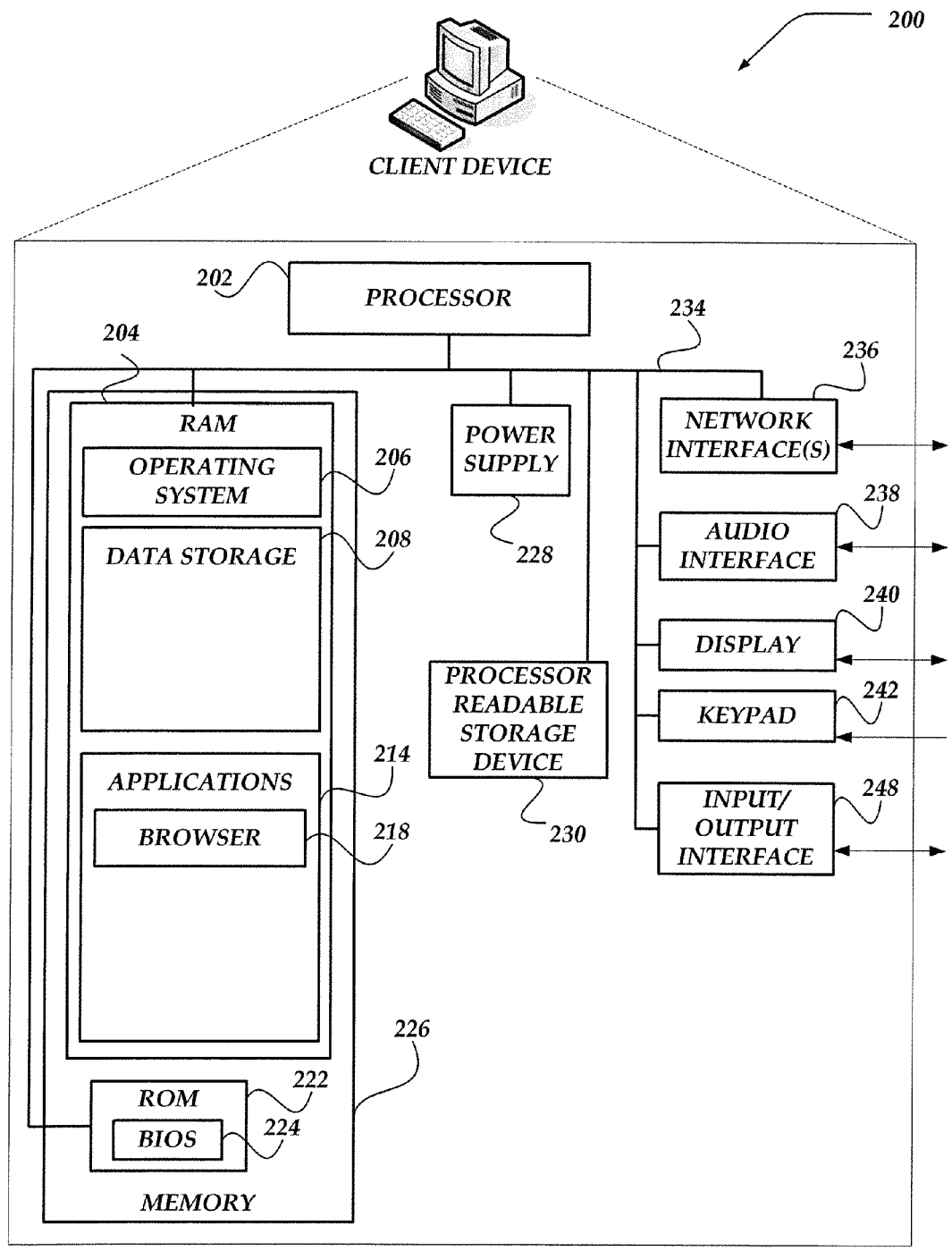
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with memory 226 via a bus 234. Client device 200 also includes a power supply 228, one or more network interfaces 236, an audio interface 238, a display 240, a keypad 242, and an input/output interface 248.

Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), High Speed Downlink Packet Access ("HSDPA"), Long Term Evolution ("LTE"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Client device 200 may also include a GPS transceiver (not shown) to determine the physical coordinates of client device 200 on the surface of the Earth. A GPS transceiver typically outputs a location as latitude and longitude values. However, the GPS transceiver can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, a GPS transceiver can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200, including, but not limited to processor readable storage device 230, a disk drive or other computer readable storage medias (not shown) within client device 200.

Processor readable storage device 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage device 230 may also be referred to herein as computer readable storage media.

Applications 214 may include computer executable instructions which, when executed by client device 200, transmit, receive, and/or otherwise process network data. Network data may include, but is not limited to, messages (e.g., SMS, Multimedia Message Service ("MMS"), instant message ("IM"), email, and/or other messages), audio, video, and enable telecommunication with another user of another client device. Applications 214 may include, for example, browser 218. Applications 214 may include other applications, which may include, but are not limited to, calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth.

Browser 218 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to communicate with another network device, such as PTMD 109 and/or indirectly with server devices 110-111.

Illustrative Network Device

Figure 3:
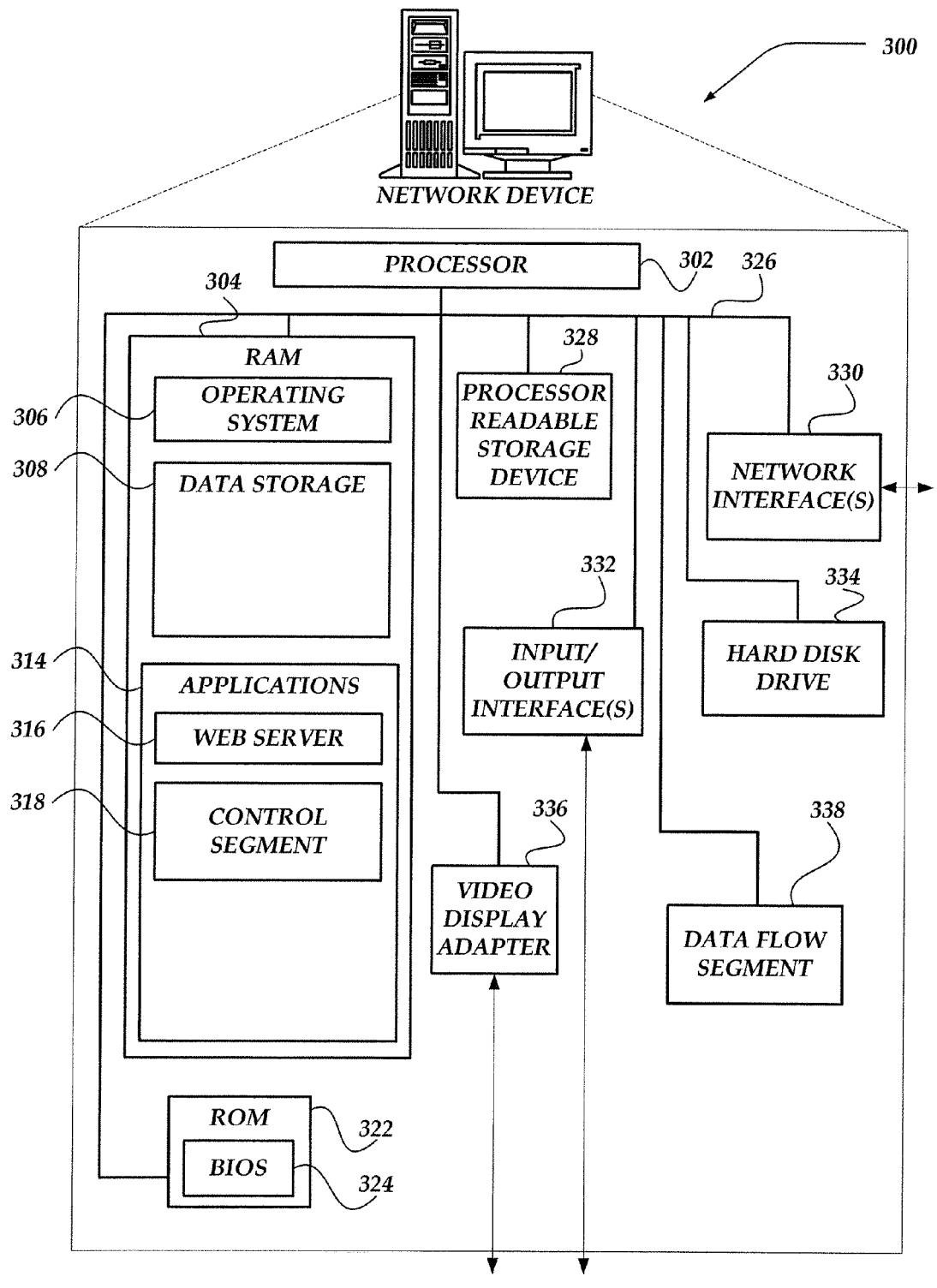
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example PTMD 109 of FIG. 1, server devices 110-111 of FIG. 1, and/or other network devices.

Network device 300 includes processor 302, processor readable storage device 328, network interface unit 330, an input/output interface 332, hard disk drive 334, video display adapter 336, data flow segment ("DFS") 338 and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer readable media, namely computer readable storage media and/or processor readable storage media, including processor readable storage device 328. Processor readable storage device 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as central processing unit 302 to execute and perform actions. In one embodiment, at least some of data store 308 might also be stored on another component of network device 300, including, but not limited to processor-readable storage device 328, hard disk drive 334, or the like.

The mass memory may also stores program code and data. One or more applications 314 may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 316 and control segment ("CS") 318 may also be included as application programs within applications 314.

Web server 316 represent any of a variety of services that are configured to provide content, including messages, over a network to another computing device. Thus, web server 316 includes, for example, a web server, a File Transfer Protocol ("FTP") server, a database server, a content server, or the like. Web server 316 may provide the content including messages over the network using any of a variety of formats including, but not limited to WAP, HDML, WML, SGML, HTML, XML, Compact HTML ("cHTML"), Extensible HTML ("xHTML"), or the like. Web server 316 may also be configured to enable a user of a client device, such as client devices 102-105 of FIG. 1, to browse websites, upload user data, or the like.

Network device 300 may also include DFS 338 for maintaining connection flows between client devices, such as client devices 102-105 of FIG. 1, and server devices, such as server devices 110-111 of FIG. 1. In one embodiment, DFS 338 may include hardware-optimized operations for packet traffic management, such as repetitive operations associated with packet traffic management. For example, DFS 338 may perform statistics gathering, per-packet policy enforcement (e.g., packet address translations), or the like, on connection flows maintained at DFS 338. In some embodiments, DFS 338 may route, switch, forward, and/or otherwise direct packets based on rules for a particular connection flow signature (e.g., a 5 tuple of a received packet). Thus, DFS 338 may include capabilities and perform tasks such as that of a router, a switch, a routing switch, or the like. In some embodiments, the rules for a particular connection flow signature may be based on instructions received from CS 318. In one embodiment, DFS 338 may store the instructions received from CS 318 in a local memory as a table or some other data structure. In some other embodiments, DFS 338 may also store a flow state table to indicate a state of current connection flows maintained at DFS 338. In at least one of the various embodiments, components of DFS 338 may comprise and/or work in combination to provide high-speed flow caches for optimizing packet traffic management.

In some embodiments, DFS 338 may provide connection flow updates to CS 318. In one embodiment, a connection flow update may include a status of the connection flow, a current state of the connection flow, other statistical information regarding the connection flow, or the like. The connection flow update may also include an identifier that corresponds to the connection flow. The identifier may be generated and provided by CS 318 when a connection flow is established at DFS 338. In some embodiments, the connection flow update may be a connection flow delete update provided to CS 318 after the connection flow is terminated at DFS 338. The connection flow update and/or the connection flow delete update may be provided to CS 318 periodically, at predefined time intervals, or the like. In some embodiments, DFS 338 may stagger a time when a plurality of connection flow updates are provided to CS.

In some other embodiments, DFS 338 may include a plurality of data flow segments. In one non-limiting example, a first data flow segment within DFS 338 may forward packets received from a client device to a server device, while a second data flow segment within DFS 338 may forward and/or route packets received from a server device to a client device. In at least one of the various embodiments, DFS 338 may also be implemented in software.

CS 318 may include a control segment that may include software-optimized operations to perform high-level control functions and per-flow policy enforcement for packet traffic management. CS 318 may be configured to manage connection flows maintained at DFS 338. In one embodiments, CS 318 may provide instructions, such as, for example, a packet address translation instructions, to DFS 338 to enable DFS 338 to forward received packets to a server device, such as server device 110-111 of FIG. 1. In some other embodiments, CS 318 may forward and/or route packets between a client device and a server device independent of DFS 338.

In at least one of the various embodiments, CS 318 may include a plurality of control segments. In some embodiments, a plurality of control segments may access and/or manage connection flows at a single data flow segments and/or a plurality of data flow segments. In some other embodiments, CS 318 may include an internal data flow segment. In one such embodiment, the internal data flow segment of CS 318 may be distributed and/or separate from CS 318. For example, in one embodiment, CS 318 may be employed in software, while the internal data flow segment may be employed in hardware. In some other embodiments, CS 318 may identify if connection flows are split between different data flow segments and/or between a DFS 338 and CS 318. In at least one embodiment, CS 318 may also be implemented in hardware.

In at least one of the various embodiments, CS 318 may be configured to generate an identifier for each connection flow established at DFS 338. In some embodiments, CS 318 may utilize a sequence number of a SYN to generate an identifier for a corresponding connection flow. In one embodiment, the identifier may be based on a hash of the sequence number. In another embodiment, the identifier may be based on an exclusive OR byte operation of the sequence number. CS 318 may cache the identifier at CS 318 and may provide the identifier to DFS 338. In some embodiments, CS 318 may cache an identifier for each connection flow it establishes at DFS 338.

In at least one of the various embodiments, CS 318 may be configured to detect packet flood attacks such as SYN flood attacks. In at least one of the various embodiments, if a flood attack may be detected the CS may enter into a flood protection state where flood control filter may be enables so new flows may be analyzed to determine if the new connection flow may be genuine rather than associated with a flood attack.

Figure 4A:
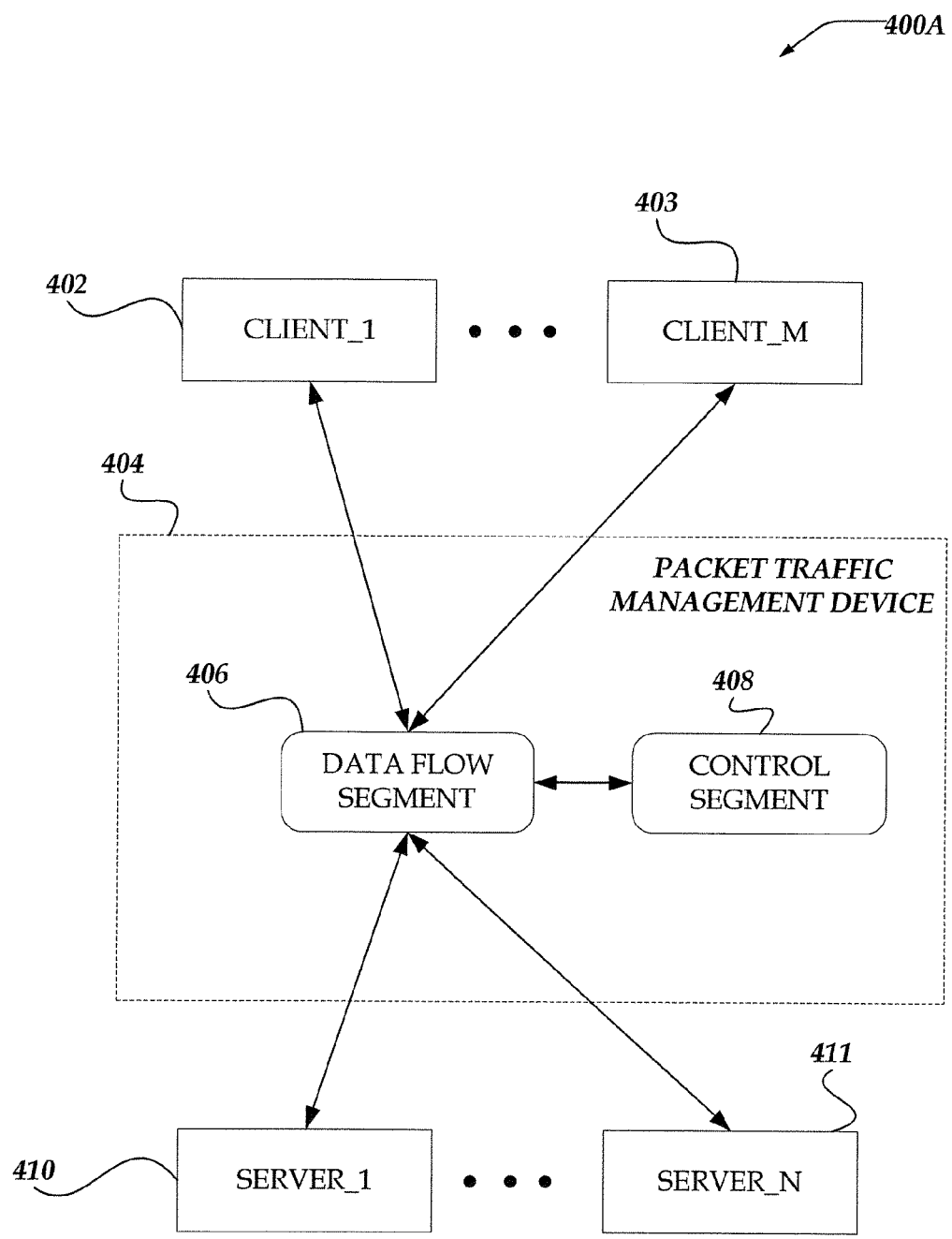
FIGS. 4A and 4B illustrate overview system diagrams generally showing embodiments of a packet traffic management device disposed between client devices and server devices in accordance with the embodiments.

FIG. 4A illustrates a system diagram generally showing one embodiment of a system with a packet traffic management device disposed between client devices and server devices. System 400A may include packet traffic management device ("PTMD") 404 disposed between client devices 402-403 and server devices 410-411. Client devices 402-403 may include Client_1 through Client_M, which may include one or more client devices, such as client devices 200 of FIG. 2. Server devices 410-411 may include Server_1 through Server_N, which may include one or more server devices, such as server devices 110-111 of FIG. 1.

In one embodiment, PTMD 404 may be an embodiment of PTMD 109 of FIG. 1. PTMD 404 may include data flow segment ("DFS") 406 in communication with control segment ("CS") 408. In at least one of the various embodiments, DFS 406 may be an embodiment of DFS 338 of FIG. 3, and CS 408 may be an embodiment of CS 318 of FIG. 3.

CS 408 may be configured to communicate with DFS 406, client devices 402-403 and/or server devices 410-411 independent of DFS 406, and/or any combination thereof. CS 408 may establish connection flows at DFS 406. In some embodiments, CS 408 may establish a connection flow at DFS 406 by providing instructions including flow control data to DFS 406 that enables DFS 406 to forward packets received at PTMD 404. In one embodiment, CS 408 may perform a load balancing operation to select a server device of server devices 410-411 to receive packets sent from a client device, such as client device 402. In some other embodiments, CS 408 may generate and cache a connection flow identifier to be provided to DFS 406 when the connection flow is established.

DFS 406 may be configured to facilitate communications between client devices 402-403 and server devices 410-411. DFS 406 may process and forward packets received at PTMD 404 based on the instructions and flow control data received from CS 408. For example, in one embodiment, DFS 406 utilizes the instructions and/or flow control data to forward packets received from client device 402 to server device 410 and to forward packets received from server device 410 to client device 402. In some embodiments, DFS 406 may forward predetermined packets to CS 408, such as, but not limited to, new connection flow requests (e.g., associated with a SYN). In yet other embodiments, DFS 406 may notify CS 408 that a packet was received and forwarded. In one non-limiting, non-exhaustive example, DFS 406 may notify CS 408 that an ACK was received from client device 402 and forwarded to server device 410. In at least one of the various embodiments, DFS 406 may also provide connection flow updates and a corresponding connection flow identifier to CS 408. CS 408 may compare the corresponding connection flow identifier with the cached identifier to determine if the connection flow update is valid.

In at least one of the various embodiments, DFS 406 may send evict messages to CS 408 if connection flow are evicted from the DFS 406. In at least one of the various embodiments, DFS 406 may evict a connection flow if new flows arrive and the capacity of the DFS to handle new connection flow may be exceeded. In at least one of the various embodiments, evictions from DFS 406 may occur if the high speed flow cache for storing flow control data exhausts its ability to store the flow control data for new connection flows. In at least one of the various embodiments, evict messages sent from DFS 406 to CS 408 may contain enough information to fully identify the connection flow (e.g., endpoints, ports, sequent numbers, flow state, or the like).

In at least one of the various embodiments, CS 408 may receive and route packets associated with evicted connection flows, thereby taking on some of the duties of DFS 406. In at least one of the various embodiments, some new connection flow may not be offloads to DFS 406 if CS 408 determines that the connection flows may be management on the CS or if the CS determines that more information may be required to determine if the connection flow should be offloaded to DFS 406.

Although PTMD 404 illustrates DFS 406 and CS 408 as two partitions within a single PTMD 404, the invention is not so limited. Rather, in some embodiments, DFS 406 and CS 408 may be functional blocks in a same PTMD 404 (i.e., a same chassis/computing device). In other embodiments, DFS 406 may be implemented by one or more chassis/computing devices separate from one or more other chassis/computing devices that may be utilized to implement CS 408. In yet other embodiments, CS 408 may be a module that plugs into DFS 406. Additionally, it is envisaged that the functionality of either DFS 406 and/or CS 408 may be separately implemented in software and/or hardware.

Figure 4B:
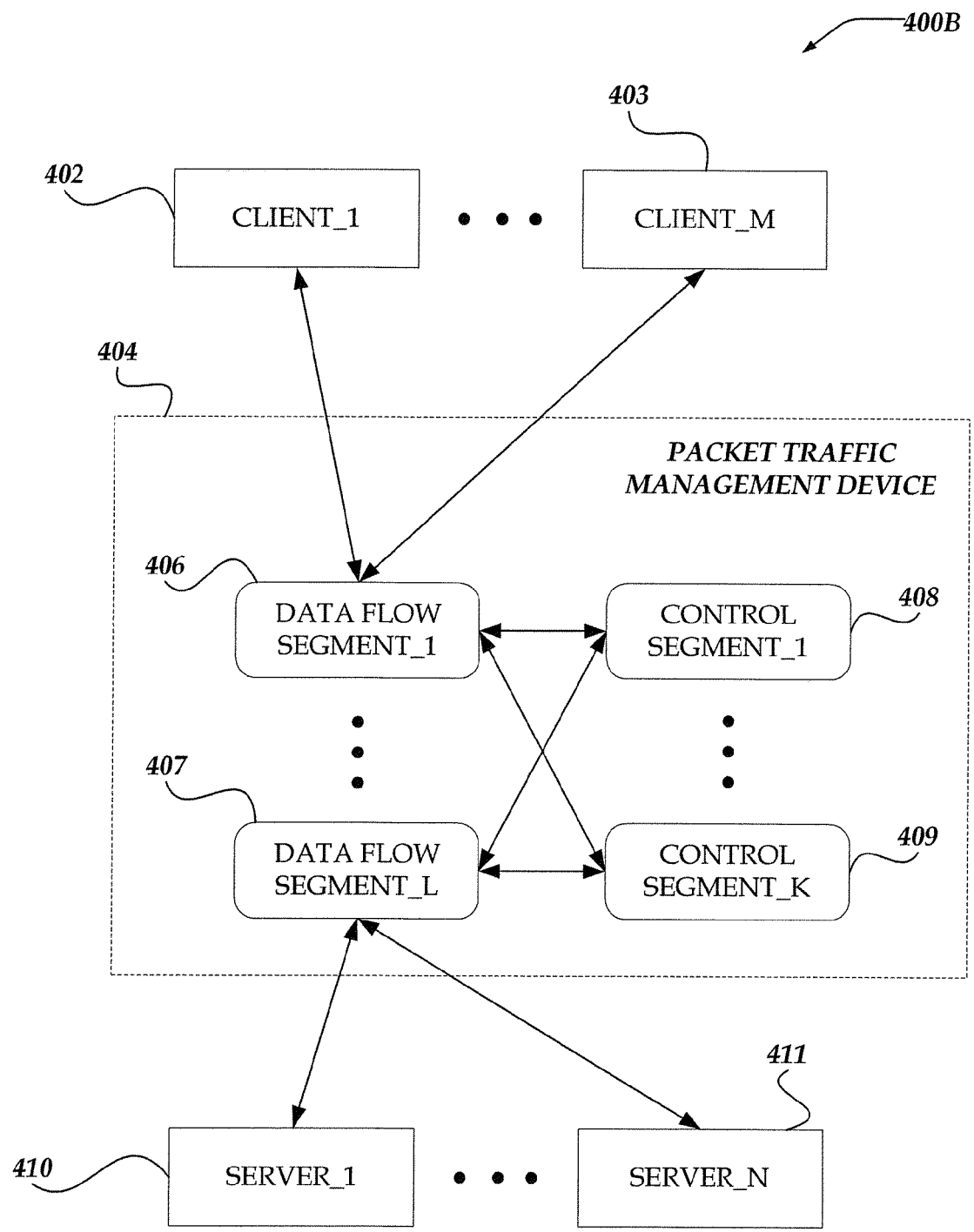

FIG. 4B illustrates a system diagram generally showing one embodiment of a system with a packet traffic management device disposed between client devices and server devices. System 400B may include packet traffic management device ("PTMD") 404 disposed between client devices 402-403 and server devices 410-411. Client devices 402-403 may include Client_1 through Client_M, which may include one or more client devices, such as client devices 102-105 of FIG. 1. Server devices 410-411 may include Server_1 through Server_N, which may include one or more server devices, such as server devices 110-111 of FIG. 1.

In one embodiment, PTMD 404 may be an embodiment of PTMD 404 of FIG. 4. PTMD 404 may include data flow segments ("DFS") 406-407 and control segments ("CS") 408-409. DFS 406-407 may include a plurality of data flow segments, each of which may be an embodiment of DFS 406 of FIG. 4A. CS 408-409 may include a plurality of control flow segments, each of which may be an embodiment of CS 408 of FIG. 4.

In some embodiments, data communicated between client devices 402-403 and server devices 410-411 may flow through one or more data flow segments 406-407. In one embodiment, data from client devices 402-403 may flow through a first DFS, such as DFS 406 and data from server devices 410-411 may flow through a second DFS, such as DFS 407.

In at least one of the various embodiments, one or more data flow segments of DFS 406-407 may communicate with one or more control segments of CS 408-409. Similarly, one or more control segments of CS 408-409 may communicate with one or more data flow segments of DFS 406-407. In some embodiments, each control segment of CS 408-409 may communicate (not shown) with other control segments of CS 408-409. In other embodiments, each data flow segment of DFS 406-407 may communicate (not shown) with other data flow segments of DFS 406-407.

Also, in at least one of the various embodiments, connection flows may be split into half-flows based on the direction of network packet travel. In at least one of the various embodiments, the network packets coming from the client may treated as a separate connection flow and the network packets coming from a server and directed towards a client may be treated as a separate connection flow. In at least one of the various embodiments, this enables optimizations based on the amount of network packet traffic of a particular half connection flow. In at least one of the various embodiments, this may enable the upload and download direction half connection flows to be split across CS 408-409 and DFS 406-407 based on the characteristics of the half connection flows. For example, in at least one of the various embodiments, if downloading streaming video may be a very asymmetric operation having many network packets download to the client and few uploaded. In at least one of the various embodiments, the half connection flow in the download direction may be optimized by using the DFS and a high-speed flow cache. While the upload direction half connection flow may be managed on the CS using lower performing (e.g., less expensive) resources.

Figure 5:
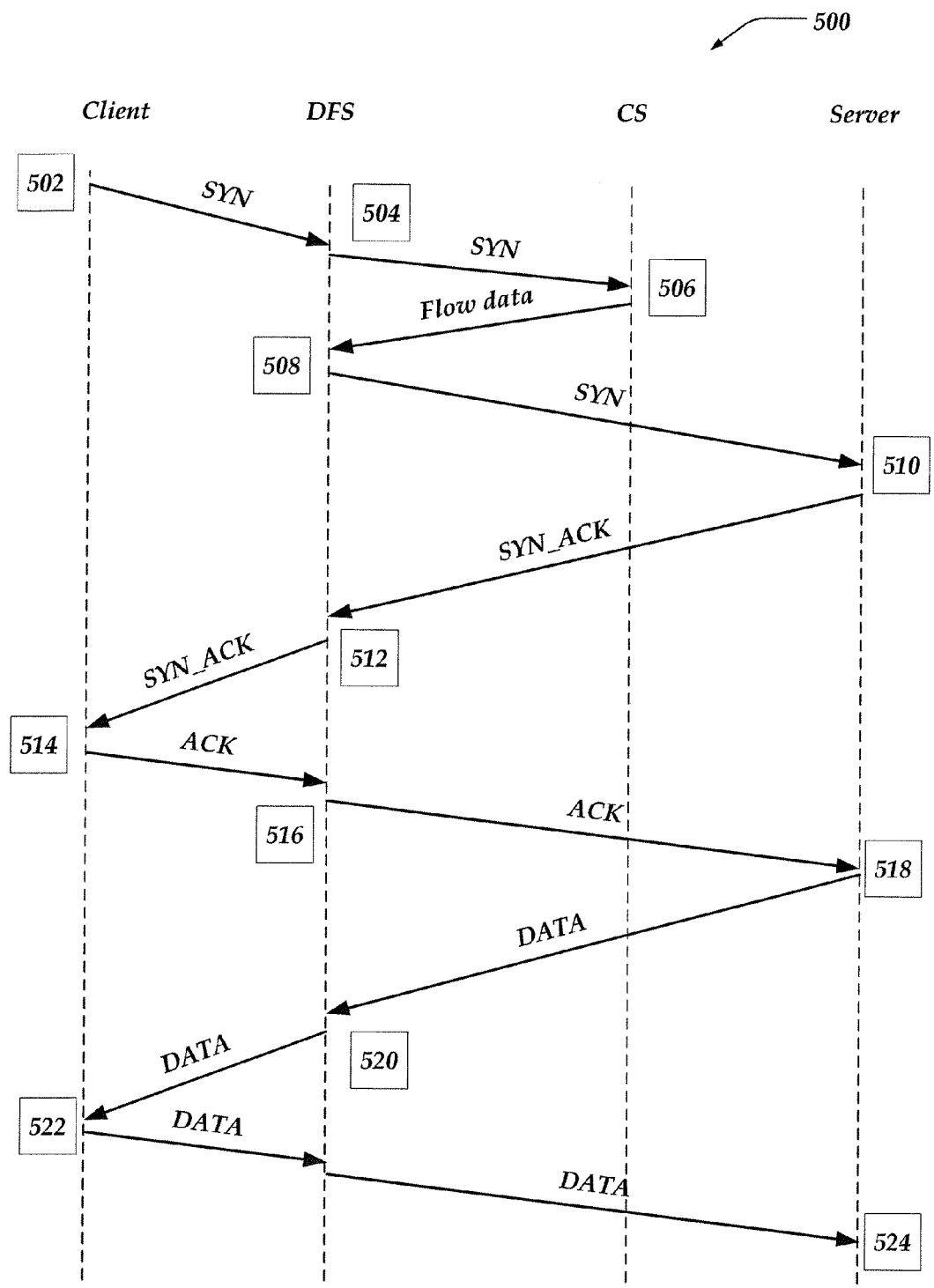
FIG. 5 illustrates a sequence diagram generally showing one embodiment of a sequence for terminating a connection flow at a data flow segment and establishing a new connection flow at the data flow segment in accordance with the embodiments.

FIG. 5 illustrates an embodiment of a sequence for establishing a connection flow and offloading the new connection flow to the data flow segment (DFS). Sequence 500 may show TCP/IP networking protocol but one of ordinary skill the art will appreciate that the sequence diagram may generally apply to other networking protocols as well. Also, even though sequence 500 depicts a sequence including one client, one DFS, one CS, and one application server, in at least one of the various embodiments, one or more, data flow segments, control segments, clients, and servers, may be participating in the connection flow and/or flow offloading.

In at least one of the various embodiments, sequence 500 begins at step 502 if a client initiates a connection with a network resource that may be managed by a PTMD, such as PTMD 109. If client may be initiating the connection using TCP/IP, a SYN packet may be sent to the PTMD.

At step 504 a SYN packet may be received at a DFS that may be part of a PTMD. In at least one of the various embodiments, at step 506, because the DFS may determine that the incoming connection represents a new connection flow, the DFS may forward the SYN packet to a CS. At step 506 a CS may examine the connection flow and may determine the appropriate flow control data for the new flow and send it to the DFS. In at least one of the various embodiments, CS may apply one or more stored rules that may be used to determine the flow control data for the new network connection flow. In at least one of the various embodiments, the stored rules may implement network traffic management services such as load balancing, application access control, or the like.

In at least one of the various embodiments, at step 508 the DFS may receive the flow control data from the CS and store it in a high speed flow cache. In at least one of the various embodiments, the flow control data may be used by the DFS to forward the SYN packet to an appropriate server and/or network resource as directed by the flow control data that may be provided by the CS.

In at least one of the various embodiments, at step 510 a server and/or network resource may receive the SYN packet and may respond by sending a SYN-ACK packet to the DFS. In at least one of the various embodiments, at step 512 the DFS may again use the flow control data stored in the high speed flow cache to map and/or translate the SYN_ACK from a server to the appropriate client.

In at least one of the various embodiments, at step 514 the client device that sent the initial SYN packet may receive the corresponding SYN_ACK and subsequently may respond with an ACK packet. In at least one of the various embodiments, at step 516 the DFS, using the stored flow control data to determine the network path the to server, may forward the ACK packet to the server.

In at least one of the various embodiments, at step 518 the server may receive the ACK packet corresponding to the client device. After the ACK may have been received, the network connection flow may be in an established state. In at least one of the various embodiments, during steps 520-524, using the established network connection flow, the server may begin exchanging application data with client. In at least one of the various embodiments, at this point, for each exchange of data, the DFS may use the flow control data that may be stored in the high speed flow cache to map between the application servers and the client to route the packets on the correct path to maintain the connection flow.

Figure 6:
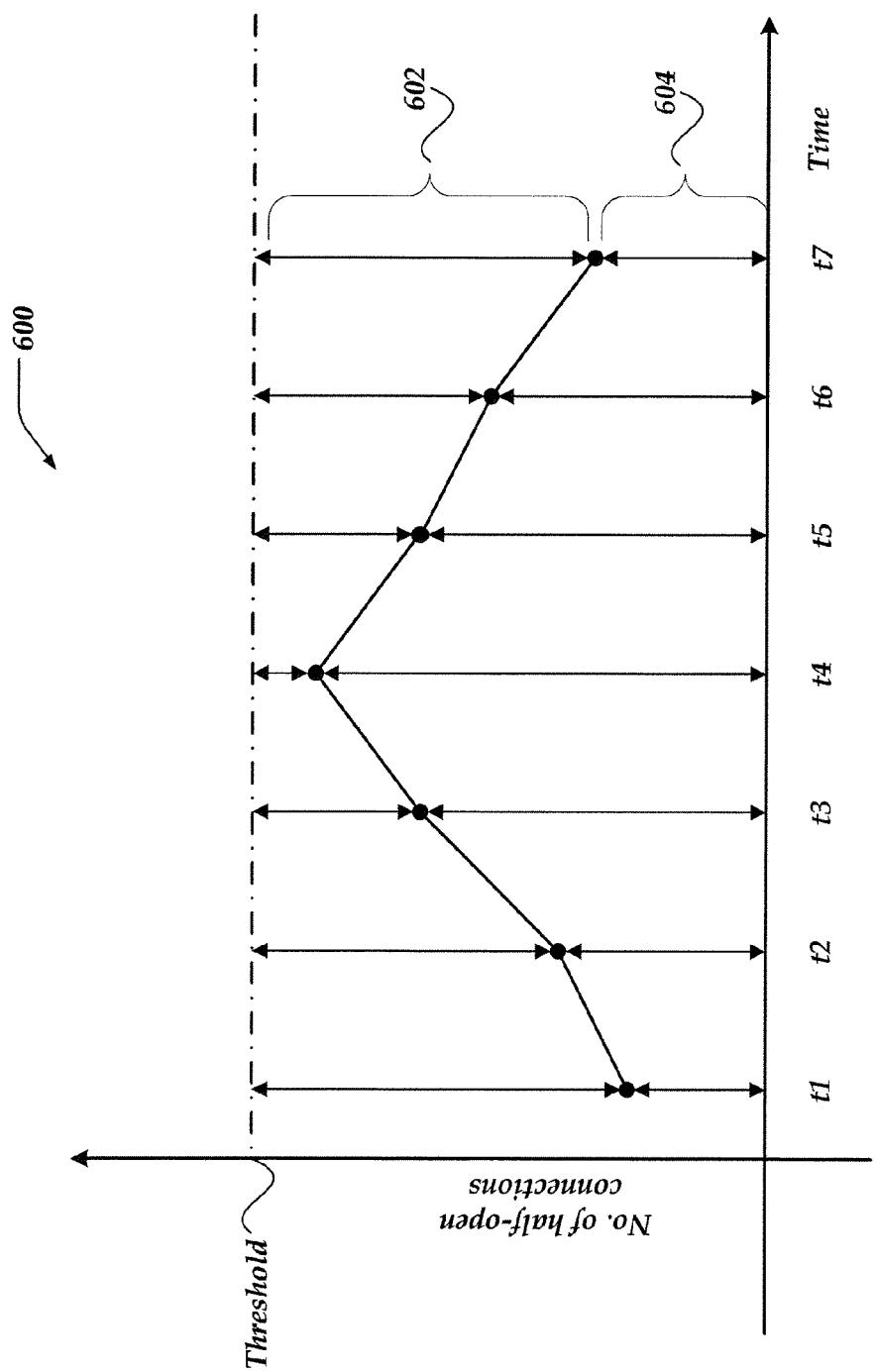
FIG. 6 shows a illustration of a flow offload control method in accordance with the embodiments.

FIG. 6 shows graph 600 of at least one of the various embodiments of a network traffic flow offload control component. In at least one of the various embodiments, if a CS may be operating in flood protection mode, one or more techniques may be used to determine if a connection flow may be offloaded to a DFS. In at least one of the various embodiments, techniques that introduce hysteresis may be enabled to avoid oscillation that may be caused by rapid changes in connection flow offloading behavior. In at least one of the various embodiments, if determining whether to offload a new connection to a DFS, an embodiment may use an algorithm illustrated by graph 600.

In at least one of the various embodiments, the PTMD may track the number of active half-open connections on the DFS (e.g., flow control information that may be in the high-speed flow cache) comparing the number with the configurable threshold. In at least one of the various embodiments, if the number of active half-open connections exceeds the threshold, the connection flow offloading as the SYN packet may be received may be ignored leaving the respective connection flow to processed by the CS. In at least one of the various embodiments, if the threshold of active half-open connections may be met, a randomized method may be utilized to determine whether the incoming connection flow may be offloaded to the DFS at the time the SYN packet may be received.

In at least one of the various embodiments, if the count of active half-open connections increases, the probability that a CS may determine to immediately offload an incoming connection flow to a DFS may decrease. Likewise, in at least one of the various embodiments, if the CS deter nines that the count of detected half-open connections exceeds a defined threshold, the CS may enter a flood attack protection mode and suspend immediate connection flow offloading.

In at least one of the various embodiments, as the count of half-open connections goes below a determined threshold, the probability of immediate off-loading of a new network connection flow to a DFS may increase.

In graph 600, the number of half-open connections is shown plotted against time. Range 602 (above the curve) represents the probability that a new connection flow may be immediately offloaded to a DFS. Similarly, in at least one of the various embodiments, range 604 (below the curve) represents the probability of deferring the offload of the new connection flow.

In at least one of the various embodiments, the probability, P, of immediate new connection flow offloading may be determined as follows:

$$P=((\text{Threshold}-\text{Base})-\text{Alpha}*\text{Number of half-open connections})/(\text{Threshold}-\text{Base})$$

In at least one of the various embodiments, values for "Threshold" and the coefficient "Alpha" may by user configuration, user-interface setting, rules based policies, or the like. In some cases, the value for "Alpha" may be adjusted based on the amount of network traffic and/or number of connections being processes by PTMD 109. In at least one of the various embodiments, if network connection traffic may be high, Alpha may be reduced to slow (e.g., smooth) the transition from SYN setup time offloading to deferring/delaying SYN setup time offloading.

General Operation

Figure 7:
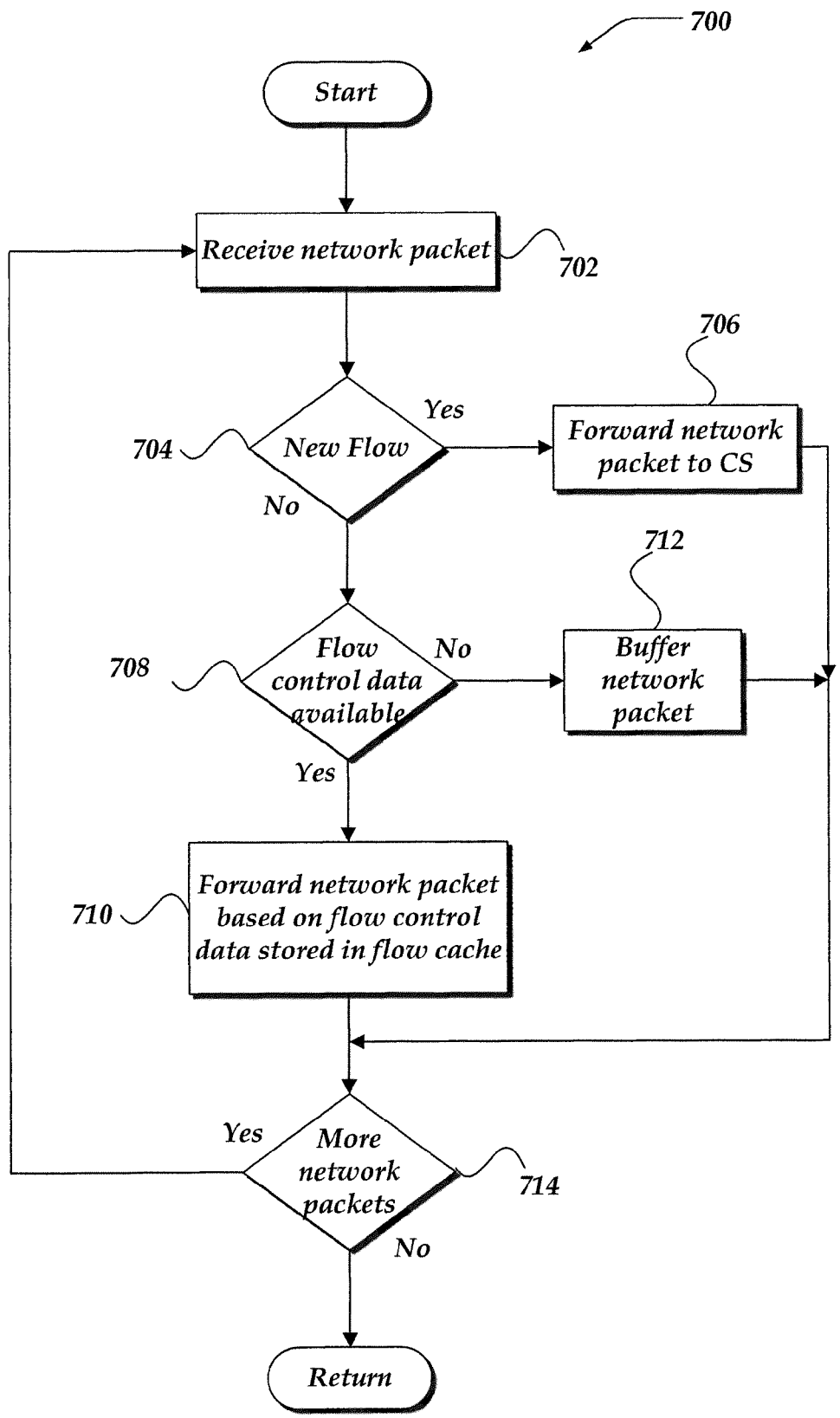
FIG. 7 shows a flowchart generally showing an overview process for network traffic management in accordance with the embodiments.

FIG. 7 shows a flowchart showing at least one of the various embodiments of a process for packet traffic management. In process 700, after a start block, at block 702 a network packet may be received by a DFS. In at least one of the various embodiments, the network packets may be received from a network 108, and/or may have been forwarded through multiple networks, switches, routers, other PTMDs or the like.

At decision block 704, in at least one of the various embodiments, if the received network packet may be associated with a new connection flow, control may move to block 706. Otherwise, in at least one of the various embodiments, control may move to decision block 708.

In at least one of the various embodiments, a DFS may examine the connection flow and compare it the flow control data that may be stored in a high-speed cache. In at least one of the various embodiments, a five tuple corresponding to the network packet may be examined to determine if the network packet is part of a new connection flow. If a tuple corresponding to the incoming network packet may not be found in the high-speed flow cache the DFS may determine that the network packet may be part of a new connection flow.

At block 706, in at least one of the various embodiments, the incoming network packet that may be associated with a new connection flow may be forwarded to a CS for further processing. In at least one of the various embodiments, the incoming network packet may be sent to a CS using a command bus that may enable DFS and CS components to exchange data and messages. Next, control may move decision block 714.

At decision block 708, in at least one of the various embodiments, if flow control data may be available for the connection flow associated with network packet, control may move to block 710. Otherwise, in at least one of the various embodiments, control may move to block 712.

At block 710, in at least one of the various embodiments, the DFS may forward the network packet to its next destination based on the flow control data and/or information associated with the network packet's corresponding connection flow that may be stored in the high speed flow cache that corresponds to the DFS. Next, in at least one of the various embodiments, control may move to decision block 714.

At block 712, in at least one of the various embodiments, the network packet having a previously seen tuple may be stored in a buffer on the DFS until flow control data may be provided by the CS.

In at least one of the various embodiments, a received network packet may be associated with a connection flow that has been previously been observed. However, in at least one of the various embodiments, if the flow control data from the CS may not be available, the DFS may store the associated network packets in a buffer until the relevant flow control data may be received from the CS.

Also, in at least one of the various embodiments, incoming network packets associated with unknown and/or new connection flows may be forwarded to the CS for buffering, rather than buffering on the DFS, until a flow control data determination may be made by the CS.

At decision block 714, in at least one of the various embodiments, if there may be more incoming network packets, control may loop back to block 702. Otherwise, in at least one of the various embodiments, control may be returned to a calling process.

Figure 8:
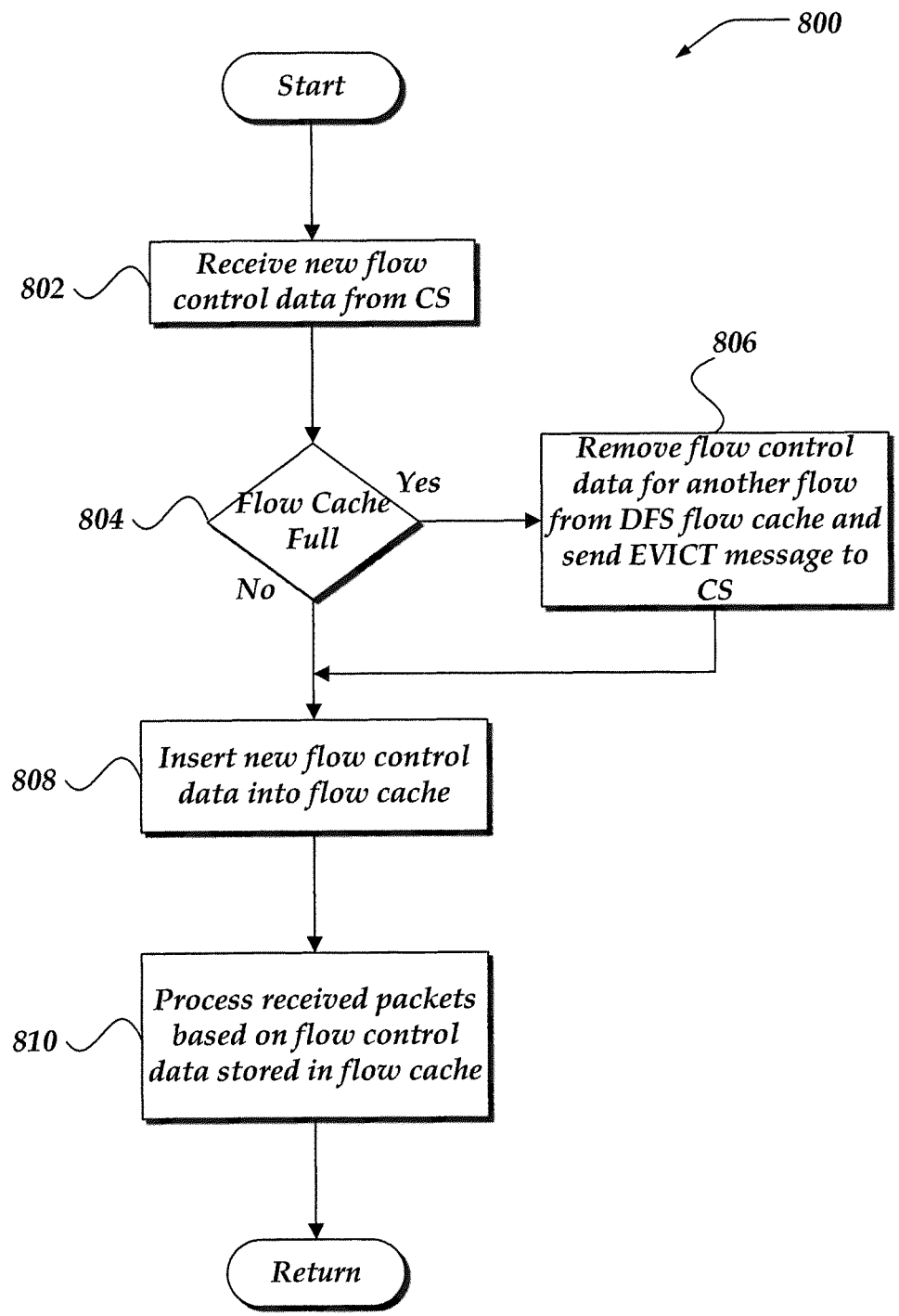
FIG. 8 shows a flowchart generally showing a process for use in handling new flows at a DFS in accordance with the embodiments.

FIG. 8 shows a flowchart of process 800, in at least one of the various embodiments, for handling new connection flows at a DFS. After a start block, at block 802 a DFS component may receive new flow control data from a CS. In at least one of the various embodiments, if new flow control data may be received, the DFS may store the flow data into a high-speed flow cache.

In at least one of the various embodiments, the new flow control data may be sent to the DFS as part of a "new flow" control message sent from the CS to the DFS.

At decision block 804, in at least one of the various embodiments, if the DFS high-speed flow cache may be full, control may move to block 806. Otherwise, in at least one of the various embodiments, control may move block 808.

At block 806, in at least one of the various embodiments, to make room for the new flow control data received from the CS, flow control data for a different, previously cached connection flow may be removed (e.g., evicted) from the DFS high-speed flow cache. In at least one of the various embodiments, the DFS may send the CS a control message indicating that a connection flow may have been evicted from the DFS requiring the associated flow control data to be removed from the DFS high-speed flow cache. In at least one of the various embodiments, the eviction message may include information, such as, number of packets sent or received over this network flow, age of the network flow, tuple information, or the like. In at least one of the various embodiments, the control message sent to the CS may contain enough information to enable the CS to identify the network flow that may be evicted from the DFS.

At block 808, in at least one of the various embodiments, the flow control data associated with the new connection flow may be stored in the DFS high-speed flow cache. In at least one of the various embodiments, flow control data may be stored in one or more components of the DFS that may operate singly or in combination as a high-speed flow cache.

At block 810, in at least one of the various embodiments, the DFS may begin to process received network packets associated with known connection flows using the flow control data that may be associated with the connection flow and stored in the high-speed flow cache.

Figure 9:
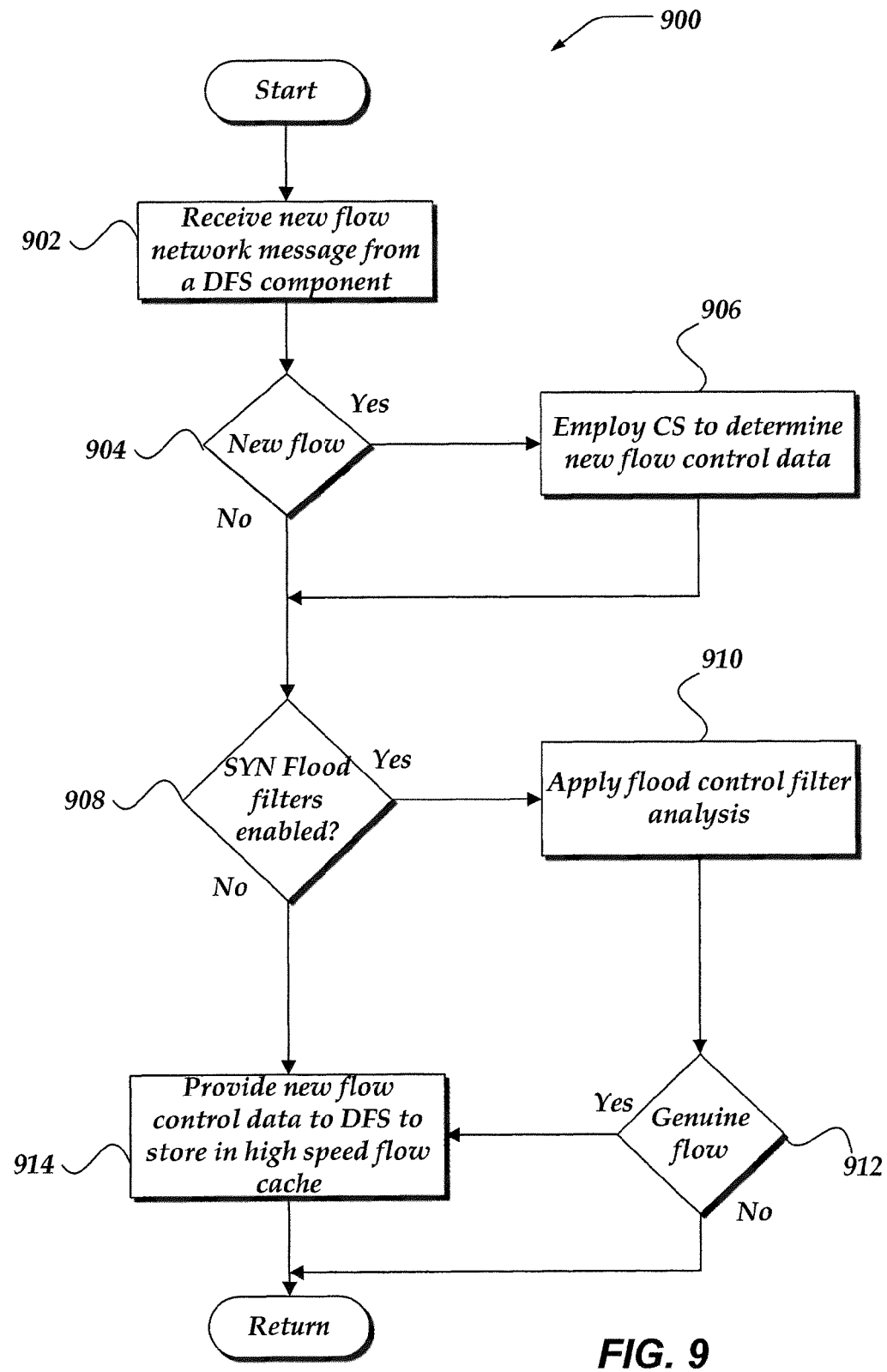
FIG. 9 shows a flowchart generally showing a process for use in handling new flows at a CS in accordance with the embodiments.

FIG. 9 shows a flowchart showing process 900 for use in handling new connection flows at a CS in accordance with the embodiments. After a start block, at block 902 the CS may receive a new connection flow message from a DFS. In at least one of the various embodiments, the message from the DFS may include the entire network packet associated with a connection from the client endpoint or the CS may receive information about the network packet such as a tuple, or a combination thereof. In at least one of the various embodiments, the DFS may send the new connection flow message and/or network packet over a control bus using a command language.

At decision block 904, in at least one of the various embodiments, if the network packet may be associated with a new and/or unknown connection flow, control may move to block 906. Otherwise, control may move to decision block 908.

In at least one of the various embodiments, a connection flow may be determined to be unknown if the tuple corresponding to the connection flow is unknown. In at least one of the various embodiments, at least one method of determining if a tuple may be unknown may be if the tuple may not be located in a lookup table, database, or the like. In at least one of the various embodiments, the CS may store received tuples and/or other new connection flow information in a cache that may be examined when new connection flow messages may be received from a DFS.

In at least one of the various embodiments, connection flows that may be unknown to the DFS may be known to the CS. At least one reason for the discrepancy, in at least one of the various embodiments, may be that the DFS may have evicted a connection flow from the high-speed cache for reason such as inactivity, quality of service (e.g., other connection flows may have require a higher quality of service), priority, or the like. Thus, in at least one of the various embodiments, the DFS may not have a record of the evicted connection flow whereas the CS may be handling the connection flow using a flow state table managed by the CS.

In at least one of the various embodiments, depending on the circumstances, a connection flow may be handled on one or more DFSs, on one or more CSs, or partially on one or more CSs and partially on one or more DFSs. In at least one of the various embodiments, if a connection flow may be being handled by the CS it may not receive a new flow network message from the DFS. Likewise, if a DFS may be handling a connection flow it may not send a new flow network message to the CS component if the DFS can associate the incoming network traffic with a known connection flow. However, in at least one of the various embodiments, the CS may analyze each connection flow to determine the connection flows may be evicted from the DFS. (See, FIG. 10 and accompanying discussion.)

At block 906, in at least one of the various embodiments, the CS may determine and generate the flow control data for the new connection flow and insert the flow control data into the CS flow cache. In at least one of the various embodiments, the CS may use arbitrarily simple and/or complex policy and configuration rules to compute the flow control data for the connection flow. In at least one of the various embodiments, after computation of the flow control data may be complete the flow control data may stored in a cache on the CS. In at least one of the various embodiments, this cache may be different and/or separate from the high-speed flow cache that may be used by the DFS.

At decision block 908, in at least one of the various embodiments, if flood control filters may be enabled control may move to block 910. Otherwise, control may move to bock 914.

In at least one of the various embodiments, bypassing the flood control filters may increase performance so in some embodiments that flood control filter may be enabled if the may be an indication that flood attacks (e.g., SYN flood attacks) are pending or impending. In at least one of the various embodiments, if conditions merit the additional analysis flood control filters and/or flood protection may be enabled.

At block 912, in at least one of the various embodiments, process 900 may perform flood control analysis on the incoming network packet. In at least one of the various embodiments, flood control filtering using the enabled flood control filters may be applied as part the analysis to determine if the new connection flow may be genuine.

At decision block 912, in at least one of the various embodiments, if the incoming network packet may be associated with a genuine connection flow, control may move to block 914. Otherwise, control may be returned to a calling process.

At block 914, in at least one of the various embodiments, the flow control data for the network connection flow associated with the received network packet that may have been generated by the CS may be provided to a DFS for storing in the high speed flow cache. In at least one of the various embodiments, if the flow control data has been provide to the DFS, process 900 may return to control to a calling process.

Figure 10:
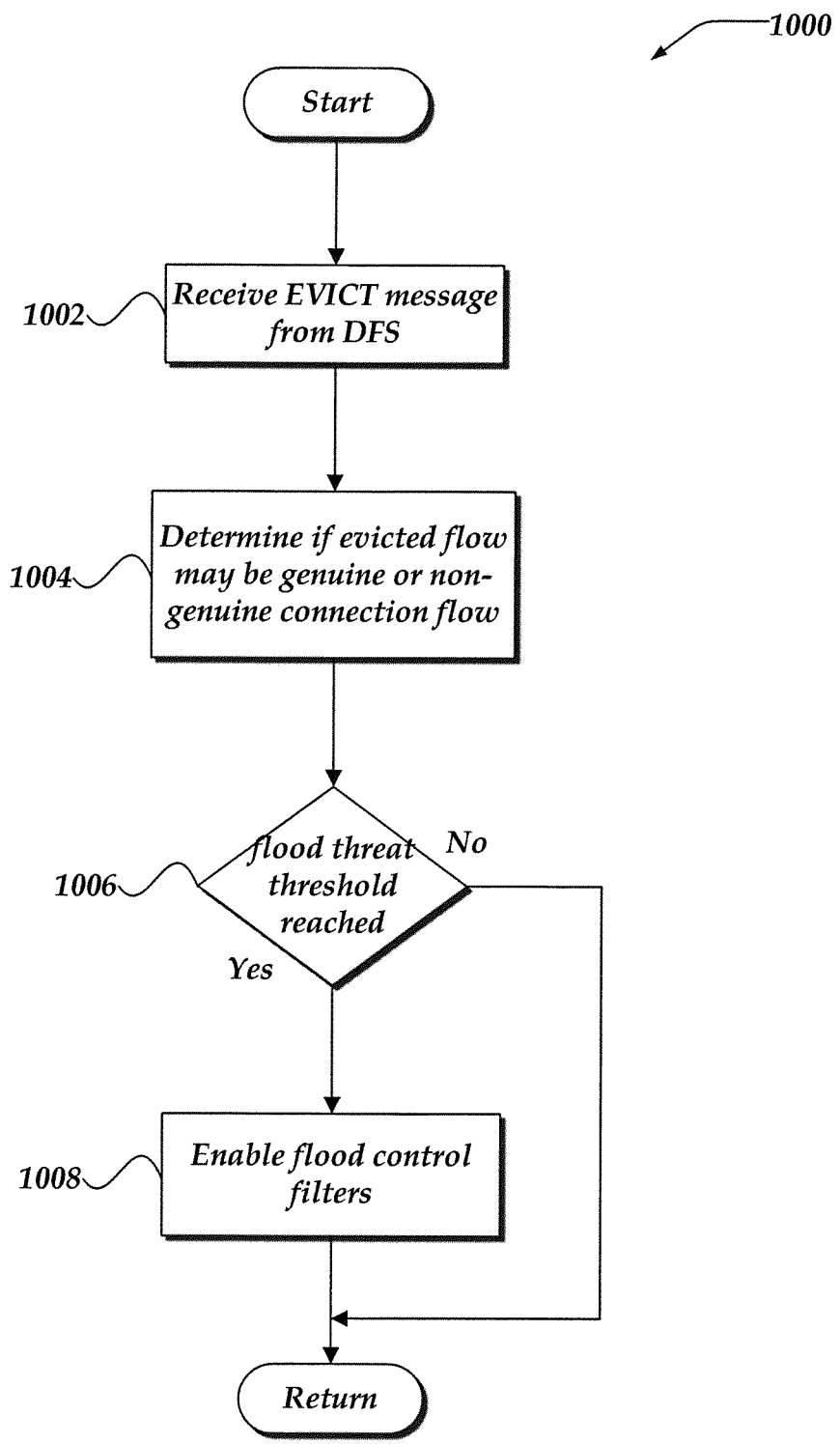
FIG. 10 shows a flowchart generally showing a process for use in determining whether enhanced SYN flood protection should be enabled in accordance with the embodiments.

FIG. 10 shows a flowchart for at least one of the various embodiments, of process 1000 for use in determining whether flood control filters may be enabled. After a start block, at block 1002, a CS may receive an evict message from a DFS.

In at least one of the various embodiments, if a DFS may be providing evict control messages to the CS, the high-speed flow cache on the DFS may be full. In at least one of the various embodiments, the DFS may evict network connection flows that have has their flow control data stored in the high-speed flow cache on the DFS to make room for new/incoming connection flows.

At block 1004, in at least one of the various embodiments, process 1000 may determine if the evicted connection flow may be genuine or non-genuine. In at least one of the various embodiments, non-genuine connection flows may represents a potential flood attack.

In at least one of the various embodiments, if the evicted connection flow may be determined to have transmitted a smaller number of network packets (e.g., 0-2) the connection flow may be part of flood attack, or other malicious attack. In at least one of the various embodiments, a low packet count may indicate the connection flow may be non-genuine because, in most cases, genuine connection flows association with genuine endpoints on the network may often transmit many packets before being evicted from a DFS high-speed flow cache.

Also, in at least one of the various embodiments, connection flows that may be in a half-open state may be determined to be non-genuine and possibly associated with a flood attack (e.g., SYN flood attack). In at least one of the various embodiments, a half-open connection flow may be a network connection where the two-way or three-way handshaking that comprises opening/establishing a network connection may not have completed. (See FIG. 5.) In at least one of the various embodiments, half-open connections may be indicative of hostile flood attacks, including SYN-flood style attacks.

In at least one of the various embodiments determining if each connection flow is genuine that is evicted from at least one high-speed flow cache includes evaluating each connection flow based in part on the contents of packets that have been exchanged over the connection flow.

In at least one of the various embodiments, the contents of network packets that may be exchanged over the connection flow may be examined to identify genuine/non-genuine connection flows. For example, the connection state of a TCP flow may be tracked by at least examining the flags and sequence numbers in the communicated network packets. In at least one of the various embodiments, from the examining these flags and sequence numbers may indicate if the connection flow may be genuine. In at least one of the various embodiments, the CS may be employed to walk the connection flow state through the standard TCP state machine and if the connection flow may be determined to in the ESTABLISHED state it may have a higher likelihood of being genuine.

Further, in at least one of the various embodiments, counting network packets the number of network packets communicated over the connection flow may indicate if the connection flow may be genuine. In at least one of the various embodiments, the greater the number of network packets communicated and acknowledged over the connection flow the greater likelihood that the connection flow may be genuine.

Also, in at least one of the various embodiments, the amount of acknowledged payload in a connection flow's associated network packets may also be employed to determine the genuineness of the connection flow. In some cases, in at least one of the various embodiments, non-genuine connection flows (malicious flows) may exhibit other well known patterns such as a slowloris attack (e.g., starting a HTTP request but not finishing timely), or the like.

In at least one of the various embodiments, a non-genuine connection flow may be indicated based on if the connection flow exhibits well-know patterns and/or characteristics of a distributed denial of service (DDOS) attack.

At decision block 1006, in at least one of the various embodiments, if the current flood threat threshold may be been exceeded or reached control may move block 1006. Otherwise, in at least one of the various embodiments, control may be returned to the calling process.

In at least one of the various embodiments, the threshold that may be used to determine if flood control filters should be enabled may be based on a configuration value, determined based on a function or formula, read from a configuration file, loaded from a data base, provided by a user-interface, or the like. In at least one of the various embodiments, function that may be used to the determine the filter enabling threshold may take into the time of day, network traffic metrics (e.g., bit rates, total connections, new connections per second, average duration of connections, or the like), quality of service, traffic and/or customer priority, or the like.

At block 1008, in at least one of the various embodiments, if the flood attack threat threshold may have been reached, process 1000 may enable flood control filters that actively guard against flood attacks. Next, control may be returned to the calling process.

Figure 11:
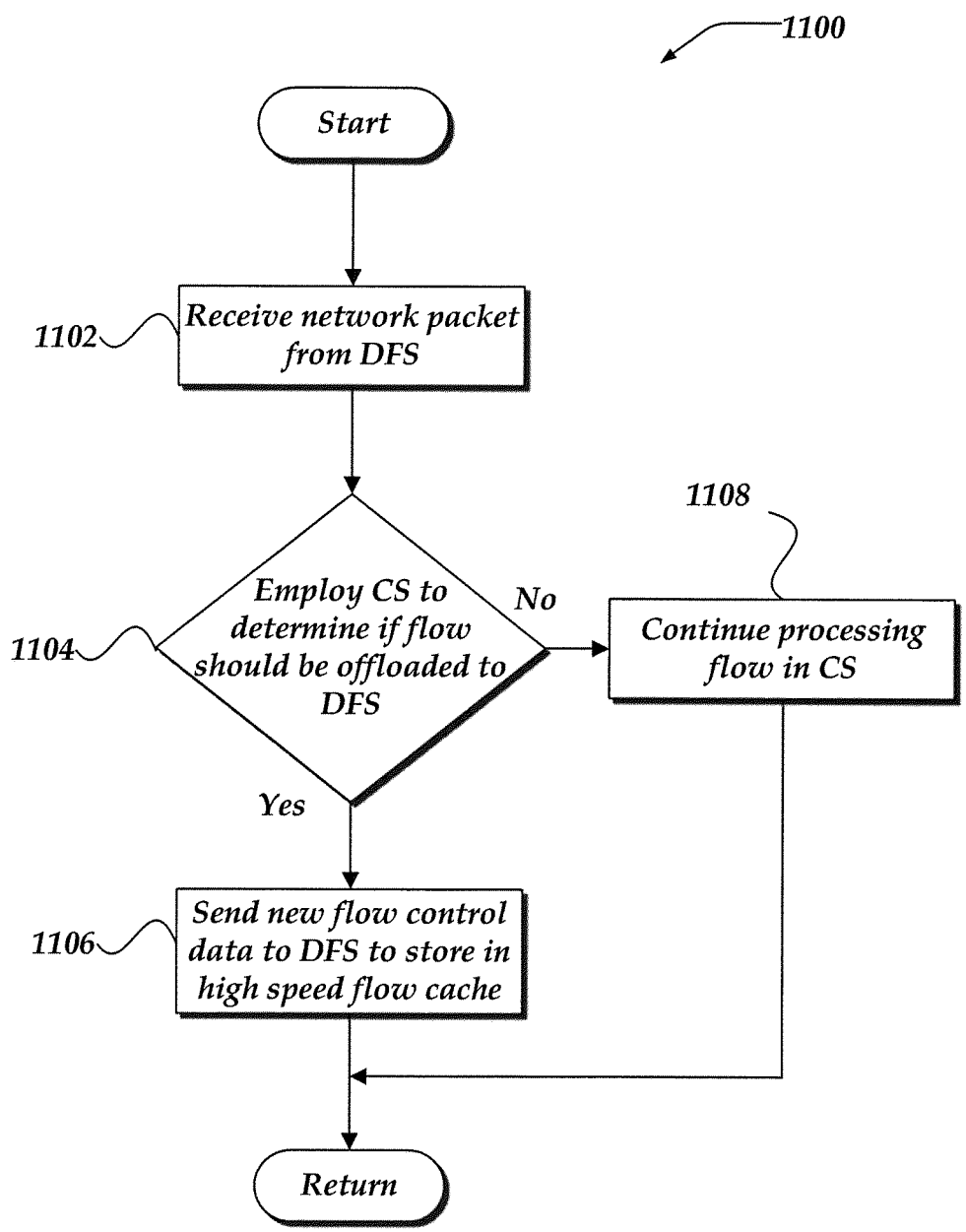
FIG. 11 shows a flowchart generally showing a process for use in handling new flows while SYN flood protection may be enabled in accordance with the embodiments.

FIG. 11 shows a flowchart showing process 1100 for use in handling new connection flows while flood protection may be enabled. After a start block, at block 1102, process 1100 may receive a network packet from the DFS. In at least one of the various embodiments, multiple flood control filters and/or protection schemes may be enabled depending on the quality and quantity network traffic and/or the number of connections that may be managed by the PTMD.

In at least one of the various embodiments, in some cases enabling flood control filtering/protection may be the default mode of operation for the process resulting in all received network packets being analyzed for genuineness before being offloaded to the DFS. In other cases, in at least one of the various embodiments, all new connection may be processed by the DFS before applying filter to improve connection processing speed.

At block 1104, in at least one of the various embodiments, process 1100 may determine if the connection flow associated with the received network packet may be offloaded to a DFS and have its associated flow control data stored in the high speed flow cache that corresponds with a DFS. In at least one of the various embodiments, the CS may apply one or more algorithms and/or heuristic processes to determine whether the connection flow associated with the received network packet may be offloaded to a DFS, including at least the formula described in conjunction with FIG. 6.

Further, in at least one of the various embodiments, the CS may maintain a running total of the statics and metrics associated with each connection flow, such as, bit rate, packet size, idle periods, or the like. In at least one of the various embodiments, these metrics may be applied by the CS to determine if a connection flow should be offloaded to the DFS. For example, in at least one of the various embodiments, connection flows having higher than average bit rates may be designated as candidates for offloading to the DFS.

In at least one of the various embodiments, if CS metrics indicate that the number of connections being managed by the PTMD may be less than the DFS capacity (e.g., one indicator may be that connections are not being evicted) the CS may offload all received connection flows to the DFS without analysis.

In at least one of the various embodiments, in some cases, to determine if a connection flow may be a candidate for offloading to the DFS for handling, the content of received network packets may be examined. In at least one of the various embodiments, the network packets may be examined to identity data patterns and meta data that may indicate the connection flow may be a hot connection flow that may be a good candidate for offloading to the DFS component.

In at least one of the various embodiments, if a network packet may be determined to be a first packet of a HTTP response, a content length value provided by the server sending the HTTP response may be available. In at least one of the various embodiments, the HTTP content length value may indicate the number of network packets that may be likely to be used to transmit the complete HTTP response from the server. For example, in at least one of the various embodiments, if the content length value may indicate that the response may use a single network packet, the associated connection flow may not be a candidate for offloading to the DFS because additional packets may not be expected for this response. On the other hand, in at least one of the various embodiments, if the content length value indicates that more network packets may be on the way for the same response, the connection flow may be determined to be a candidate for offloading to the DFS component. In at least one of the various embodiments, the content length value may correlate to the likelihood of offloading a connection flow to a DFS (e.g., an increase in the content length value leads to an increase in the chance of offloading the connection flow to the DFS).

In at least one of the various embodiments, in some cases, the operating characteristics of a connection flow may have significant variance. For example, in at least one of the various embodiments, the bit-rate for a connection may be prone to spikes if the content/communication may be uneven. Thus, in at least one of the various embodiments, a connection flow once determined to be a good offload candidate (leading to likely offloading to the DFS) may soon be determined to be a poor offload candidate (leading to likely removal from the DFS) depending on the immediate condition and/or characteristics of the underlying communication session.

In at least one of the various embodiments, if the connection flow associated with the received network packet may be offloaded to a DFS, control may move to block 1106. Otherwise, control may move to block 1108.

At block 1106, in at least one of the various embodiments, the flow control data computed by the CS and the associated connection flow data corresponding to the received network packet may be sent (e.g., offloaded) to a DFS. In at least one of the various embodiments, flow control data may include information sufficient for the DFS to process incoming and/or outgoing network packets associated with the connection flow. In at least one of the various embodiments, the flow control data associated with the connection flow that is offloaded to a DFS may be stored in a high speed flow cache that corresponds to the DFS.

At block 1108, in at least one of the various embodiments, the CS may continue to process the connection flow associated with the received network packet. In at least one of the various embodiments, the network packet may be buffered by the CS until the CS may have enough information to make a final determination regarding the genuineness of the connection flow.

In at least one of the various embodiments, if the CS determines the flow be non-genuine (e.g., related to a SYN-flood attack) the CS may discard network packets associated with the invalid connection flow.

In at least one of the various embodiments, the connection flow may remain on the CS for processing even if the connection flow may be determined to be a genuine connection flow. In such cases, in at least one of the various embodiments, the flow control processing for the network packets associated with the connection flow may occur on the CS rather than the DFS. In at least one of the various embodiments, processing a connection flow on the CS may occur if the high-speed flow cache on the DFS may be over utilized.

In at least one of the various embodiments, connection flows may be retained for processing by the CS reduce the potential for oscillation that may be caused by rapid changes in the rate of offloading connections flows to the DFS. For example, in at least one of the various embodiments, to avoid oscillation connection flows may be gradually offloaded to or from the DFS. Also, in at least one of the various embodiments, flood control filters may include a probabilistic/randomized component that may be adjusted based on system feedback to introduce hysteresis into the flood control filter process. For example, in at least one of the various embodiments, as the number of detected non-genuine connection flows increase the probability of deferring connection flow offload to the DFS may increase. Next, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed is:

1. A method for managing communication over a network with a traffic management device that includes a plurality of components and is operative to perform actions, comprising:
    employing at least one data flow segment (DFS) component to determine if at least one received network packet is associated with a new connection flow, wherein each DFS component corresponds to a high speed flow cache;
    employing at least one control segment (CS) component to perform actions, including:
        determining if each connection flow is genuine that is evicted from at least one high-speed flow cache;
        if an amount of non-genuine connection flows exceeds a threshold, enabling at least one flood control filter; and
        if a new connection flow is determined to be genuine, generating flow control data that corresponds to the new connection flow; and
    employing the at least one DFS component to store the flow control data for each genuine connection flow in at least one high speed flow cache; and
    employing the at least one DFS component to forward received network packets for each genuine connection flow based on its corresponding flow control data stored in at least one high-speed flow cache.

2. The method of claim 1, wherein determining if each connection flow is genuine that is evicted from at least one high-speed flow cache further comprises evaluating each connection flow based in part on the number of packets that have been exchanged over the connection flow.

3. The method of claim 1, wherein determining if each connection flow is genuine further comprises evaluating each connection flow based at least in part on the content of at least one packet that was communicated over each connection flow.

4. The method of claim 1, wherein enabling the at least one enabled flood control filter further comprises deferring the generation of flow control data for the new connection flow until a full open connection corresponding to the new connection flow is established.

5. The method of claim 1, wherein enabling the flood control filter further comprises determining if the flow control data associated with the new connection flow is stored in the high-speed flow cache based on at least a ratio of the amount of genuine connection flows to non-genuine connection flows detected over a period of time.

6. The method of claim 1, wherein enabling the flood control filter further comprises determining if the flow control data associated with the new connection flow is stored in the high-speed flow cache based at least on the amount of network traffic over the connection flow, or at least a portion of the at least one received network packet.

7. The method of claim 1, further comprising:
dividing the new connection flow into an upload half connection flow and a download half connection flow;
generating separate flow control data for each half connection flow; and
storing the flow control data for each half connection flow in the high-speed flow cache based on the at least one enabled flood control filter.

8. The method of claim 1, further comprising:
employing the DFS component to identify each idle genuine connection flow that has associated flow control data stored in the high-speed flow cache that corresponds to the DFS component;
employing the DFS component to remove the flow control data associated with each identified idle genuine connection flow from the high-speed flow cache that corresponds to the DFS component; and
employing the DFS component to store the removed flow control data if new network activity occurs on the idle genuine connection flow.

9. A traffic management device (TMD) that is operative to manage communication over a network, comprising:
a transceiver that is operative to communicate over a network;
a memory that is operative to store at least instructions for a plurality of components; and
a processor device that is operative to execute instructions that enable actions, including:
employing at least one data flow segment (DFS) component to determine if at least one received network packet is associated with a new connection flow, wherein each DFS component corresponds to a high speed flow cache;
employing at least one control segment (CS) component to perform actions, including:
determining if each connection flow is genuine that is evicted from at last one high-speed flow cache;
if an amount of non-genuine connection flows exceeds a threshold, enabling at least one flood control filter; and
if a new connection flow is determined to be genuine, generating flow control data that corresponds to the new connection flow; and
employing the at least one DFS component to store the flow control data for each genuine connection flow in at least one high speed flow cache; and
employing the at least one DFS component to forward received network packets for each genuine connection flow based on its corresponding flow control data stored in at least one high-speed flow cache.

10. The TMD of claim 9, wherein determining if each connection flow is genuine that is evicted from at least one high-speed flow cache further comprises evaluating each connection flow based in part on the number of packets that have been exchanged over the connection flow.

11. The TMD of claim 9, wherein determining if each connection flow is genuine further comprises evaluating each connection flow based at least in part on the content of at least one packet that was communicated over each connection flow.

12. The TMD of claim 9, wherein enabling the at least one enabled flood control filter further comprises deferring the generation of flow control data for the new connection flow until a full open connection corresponding to the new connection flow is established.

13. The TMD of claim 9, wherein enabling the flood control filter further comprises determining if the flow control data associated with the new connection flow is stored in the high-speed flow cache based on at least a ratio of the amount of genuine connection flows to non-genuine connection flows detected over a period of time.

14. The TMD of claim 9, wherein enabling the flood control filter further comprises determining if the flow control data associated with the new connection flow is stored in the high-speed flow cache based at least on the amount of network traffic over the connection flow, or at least a portion of the at least one received network packet.

15. The TMD of claim 9, further comprising:
dividing the new connection flow into an upload half connection flow and a download half connection flow;
generating separate flow control data for each half connection flow; and
storing the flow control data for each half connection flow in the high-speed flow cache based on the at least one enabled flood control filter.

16. The TMD of claim 9, further comprising:
employing the DFS component to identify each idle genuine connection flow that has associated flow control data stored in the high-speed flow cache that corresponds to the DFS component;
employing the DFS component to remove the flow control data associated with each identified idle genuine connection flow from the high-speed flow cache that corresponds to the DFS component; and
employing the DFS component to store the removed flow control data if new network activity occurs on the idle genuine connection flow.

17. A processor readable non-transitive storage media that includes instructions for a method for managing communication over a network with a traffic management device that includes a plurality of components and is operative to execute the instructions to perform actions, comprising:
employing at least one data flow segment (DFS) component to determine if at least one received network packet is associated with a new connection flow, wherein each DFS component corresponds to a high speed flow cache;
employing at least one control segment (CS) component to perform actions, including:
determining if each connection flow is genuine that is evicted from at last one high-speed flow cache;
if an amount of non-genuine connection flows exceeds a threshold, enabling at least one flood control filter; and if a new connection flow is determined to be genuine, generating flow control data that corresponds to the new connection flow; and employing the at least one DFS component to store the flow control data for each genuine connection flow in at least one high speed flow cache; and employing the at least one DFS component to forward received network packets for each genuine connection flow based on its corresponding flow control data stored in at least one high-speed flow cache.

18. The media of claim 17, wherein determining if each connection flow is genuine that is evicted from at least one high-speed flow cache further comprises evaluating each connection flow based in part on the number of packets that have been exchanged over the connection flow.

19. The media of claim 17, wherein determining if each connection flow is genuine further comprises evaluating each connection flow based at least in part on the content of at least one packet that was communicated over each connection flow.

20. The media of claim 17, wherein enabling the at least one enabled flood control filter further comprises deferring the generation of flow control data for the new connection flow until a full open connection corresponding to the new connection flow is established.

21. The media of claim 17, wherein enabling the flood control filter further comprises determining if the flow control data associated with the new connection flow is stored in the high-speed flow cache based on at least a ratio of the amount of genuine connection flows to non-genuine connection flows detected over a period of time.

22. The media of claim 17, wherein enabling the flood control filter further comprises determining if the flow control data associated with the new connection flow is stored in the high-speed flow cache based at least on the amount of network traffic over the connection flow, or at least a portion of the at least one received network packet.

23. The media of claim 17, further comprising:
dividing the new connection flow into an upload half connection flow and a download half connection flow;
generating separate flow control data for each half connection flow; and
storing the flow control data for each half connection flow in the high-speed flow cache based on the at least one enabled flood control filter.

24. The media of claim 17, further comprising:
employing the DFS component to identify each idle genuine connection flow that has associated flow control data stored in the high-speed flow cache that corresponds to the DFS component;
employing the DFS component to remove the flow control data associated with each identified idle genuine connection flow from the high-speed flow cache that corresponds to the DFS component; and
employing the DFS component to store the removed flow control data if new network activity occurs on the idle genuine connection flow.

\* \* \* \* \*